United States Patent
Aoyanagi

(10) Patent No.: US 11,297,292 B2
(45) Date of Patent: Apr. 5, 2022

(54) PROJECTOR, STACK DISPLAY SYSTEM, IMAGE DISPLAY METHOD, AND PROGRAM

(71) Applicant: Sharp NEC Display Solutions, Ltd., Tokyo (JP)

(72) Inventor: Hisakazu Aoyanagi, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 17/260,152

(22) PCT Filed: Jul. 19, 2018

(86) PCT No.: PCT/JP2018/027139
§ 371 (c)(1),
(2) Date: Jan. 13, 2021

(87) PCT Pub. No.: WO2020/016999
PCT Pub. Date: Jan. 23, 2020

(65) Prior Publication Data
US 2021/0321067 A1   Oct. 14, 2021

(51) Int. Cl.
*H04N 9/31* (2006.01)

(52) U.S. Cl.
CPC ......... *H04N 9/3182* (2013.01); *H04N 9/3147* (2013.01); *H04N 9/3155* (2013.01)

(58) Field of Classification Search
CPC .. H04N 9/3147; H04N 9/3155; H04N 9/3182; H04N 9/31; H04N 9/3108; H04N 9/3141; H04N 9/3179; G09G 2320/0271; G09G 2320/0646; G09G 2300/023; G09G 3/3406; G09G 2340/0428; G03B 21/14

USPC ...... 348/759, 744, 739; 353/94; 345/4, 5, 40
See application file for complete search history.

(56) References Cited

U.S. PATENT DOCUMENTS

2017/0078629 A1\* 3/2017 Kozak ................. H04N 9/3147

FOREIGN PATENT DOCUMENTS

| JP | 2012-249163 A | 12/2012 |
| JP | 2013-250284 A | 12/2013 |
| JP | 2017-181668 A | 10/2017 |
| JP | 2017-2001 04 A | 11/2017 |

(Continued)

OTHER PUBLICATIONS

International Search Report (ISR) (PCT Form PCT/ISA/210), in PCT/JP2018/027139, dated Oct. 9, 2018.

*Primary Examiner* — Sherrie Hsia
(74) *Attorney, Agent, or Firm* — McGinn I.P. Law Group, PLLC.

(57) ABSTRACT

A projector includes a light source; a spatial light modulator; a signal processing unit that includes a tone map unit that performs a luminance gradation conversion of an input video data according to a tone map indicating a relationship of an output luminance with respect to an input luminance; a luminance acquiring unit that obtains a maximum luminance of a projection surface of the modulated light; and a control unit that controls an amount of light of the light source and sets the tone map. When the maximum luminance of the projection surface is equal to or greater than a first threshold value indicating a maximum luminance of the input video data, the control unit sets, to the tone map unit, a tone map in which a maximum value of the output luminance is set to be the first threshold value.

21 Claims, 28 Drawing Sheets

(56) References Cited

FOREIGN PATENT DOCUMENTS

| | | |
|---|---|---|
| JP | 2017-198733 A | 11/2017 |
| JP | 2018-067786 A | 4/2018 |

\* cited by examiner

[Fig. 1]
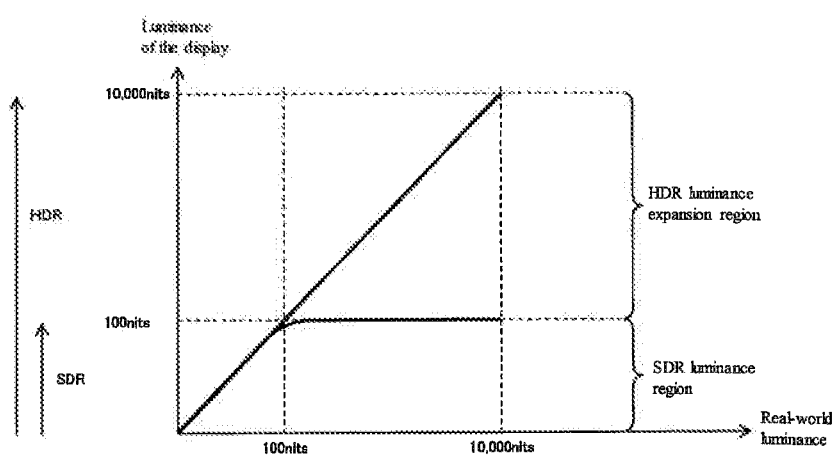

[Fig. 2]
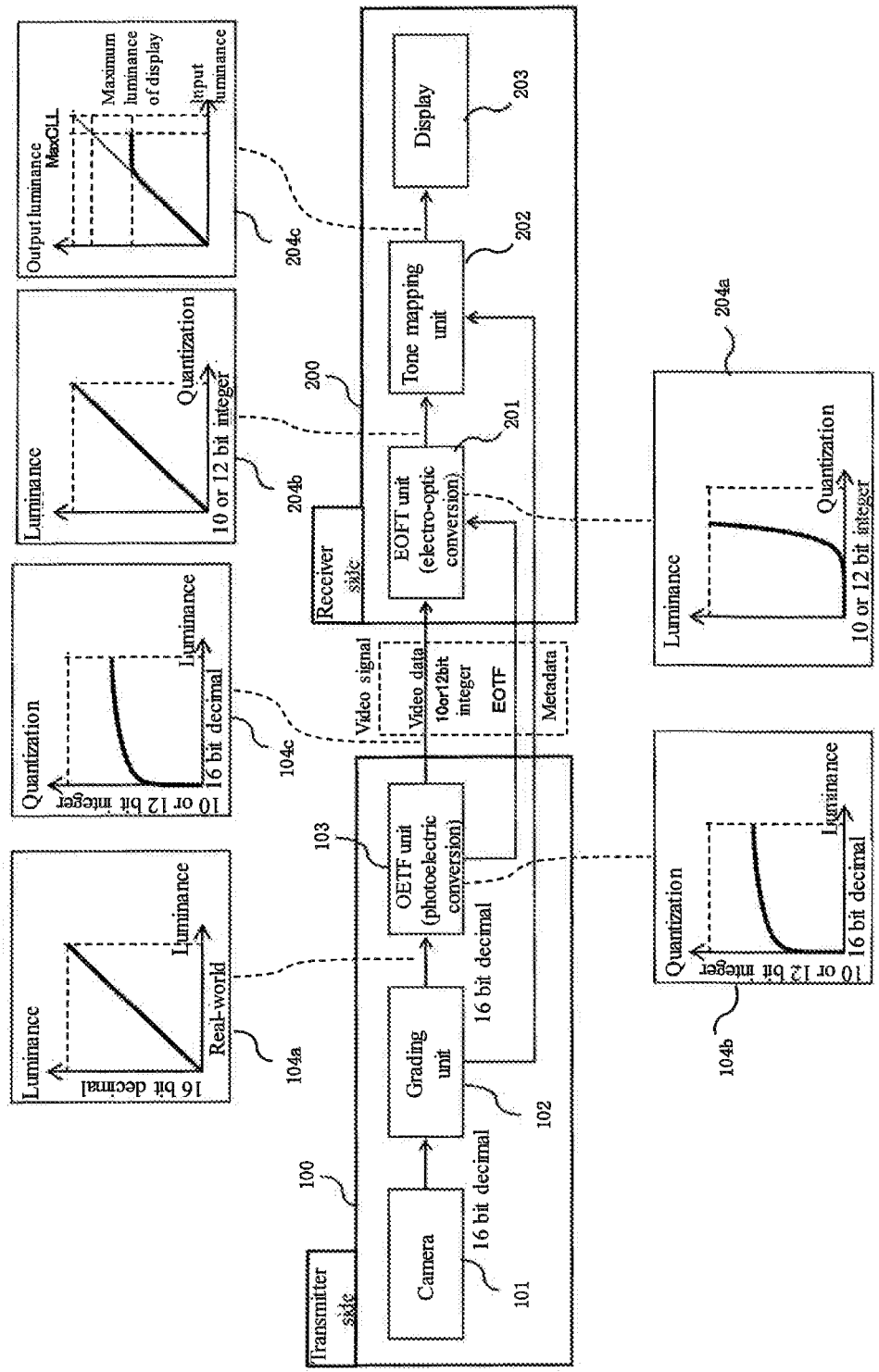

[Fig. 3]
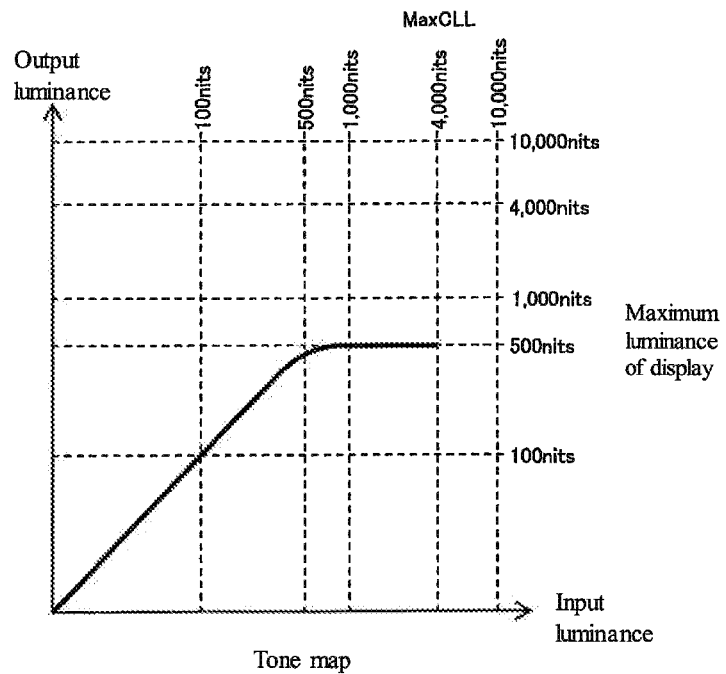
[Fig. 4]
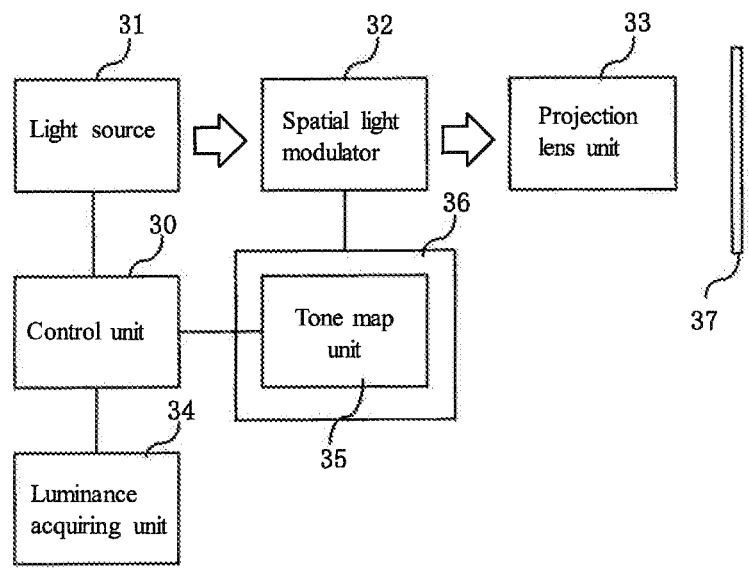

[Fig. 5]
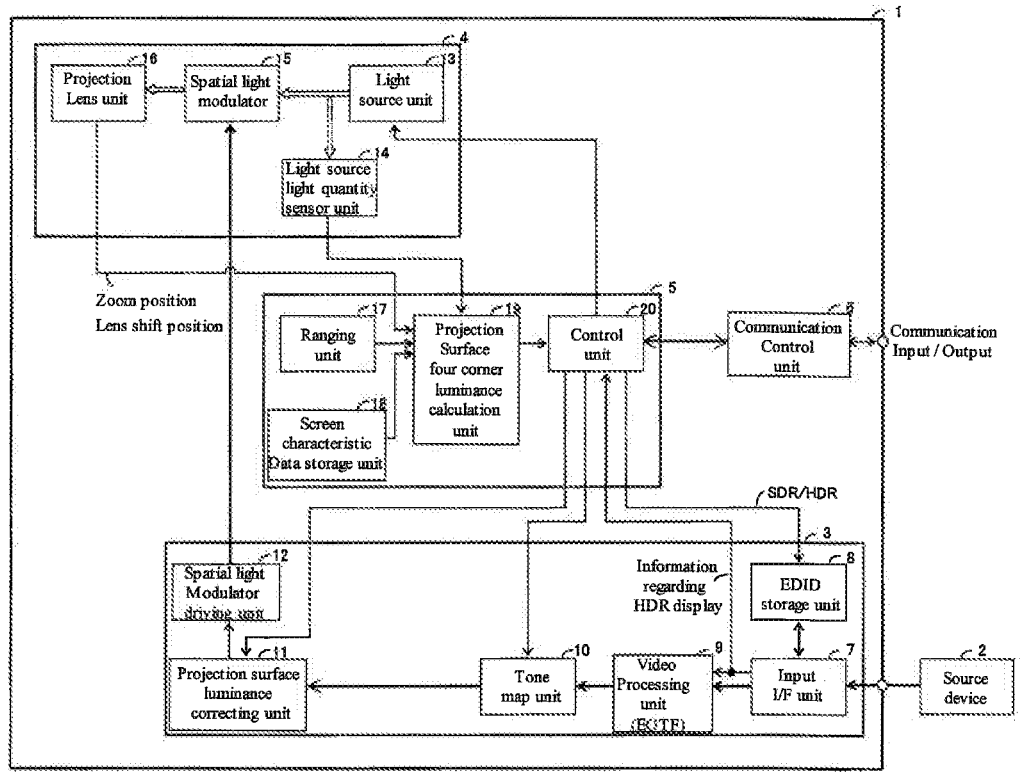
[Fig. 6A]
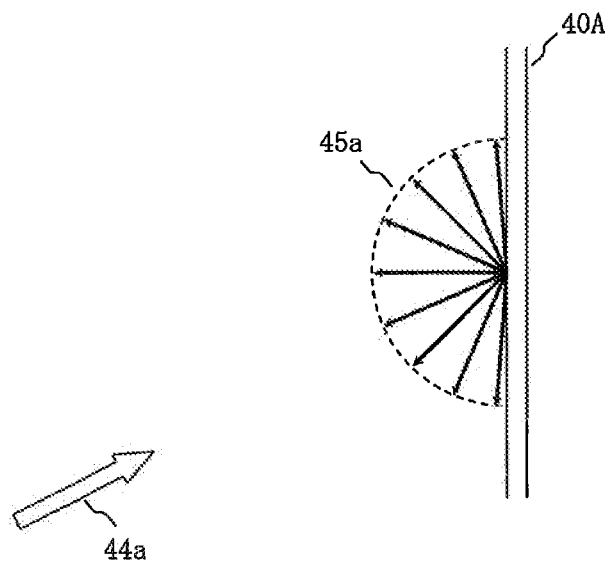

[Fig. 6B]
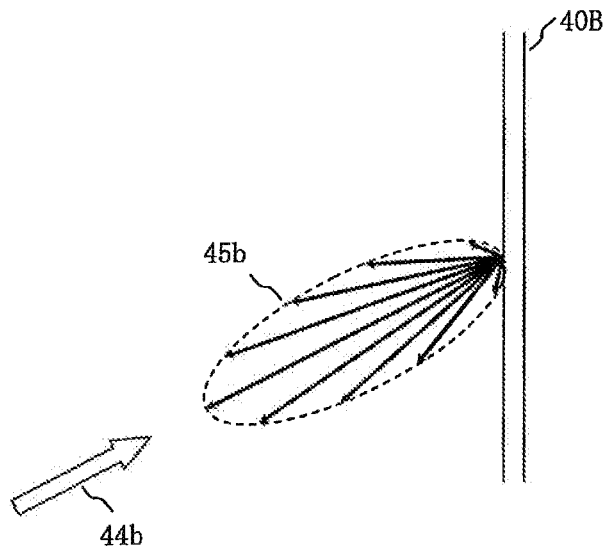
[Fig. 6C]
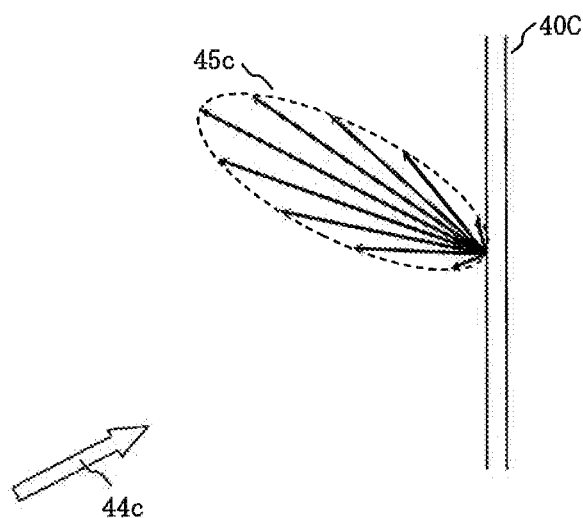

[Fig. 7]
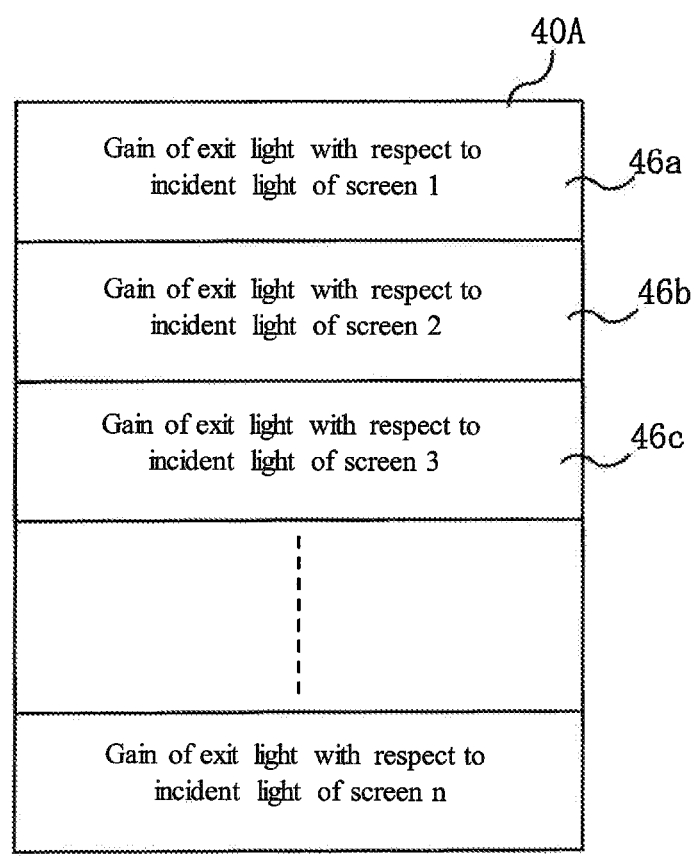

[Fig. 8]
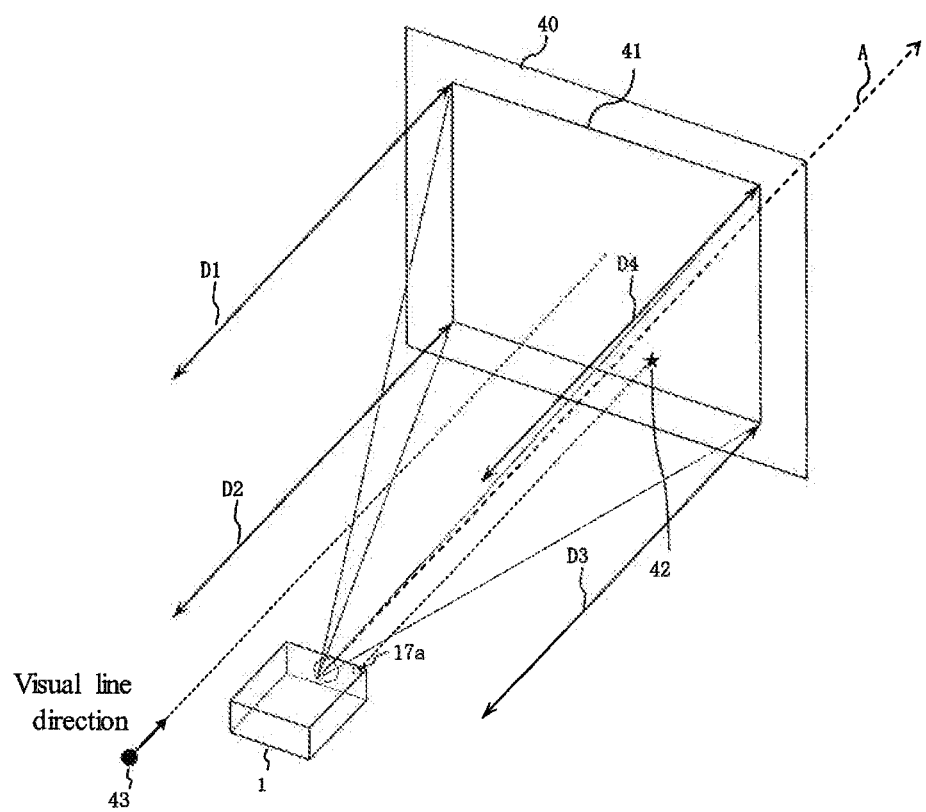

[Fig. 9]
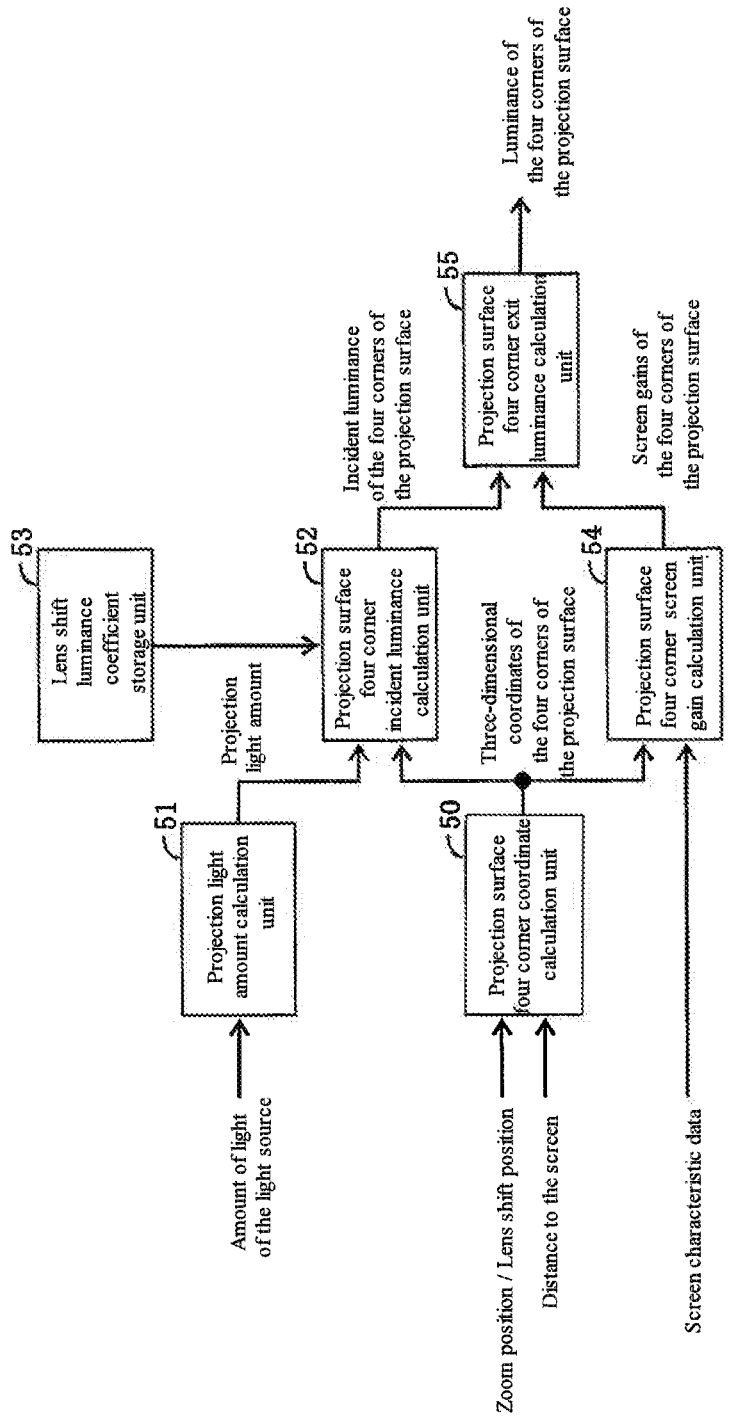

[Fig. 10]
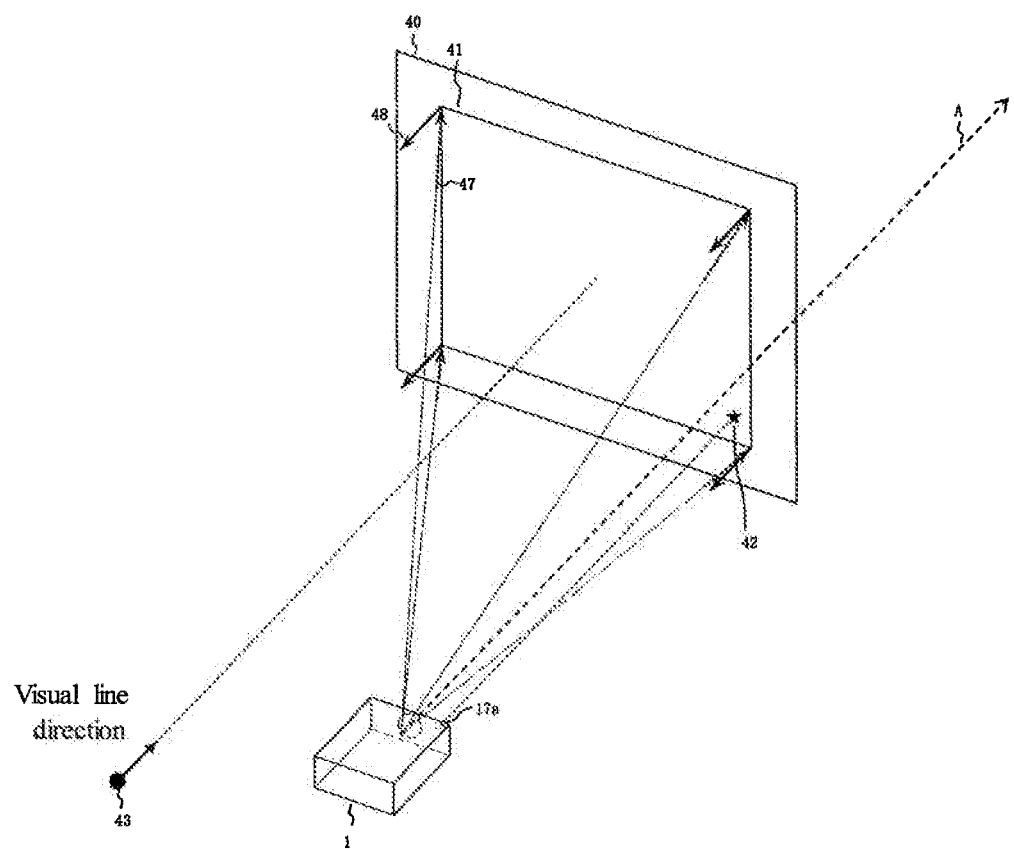

[Fig. 11]
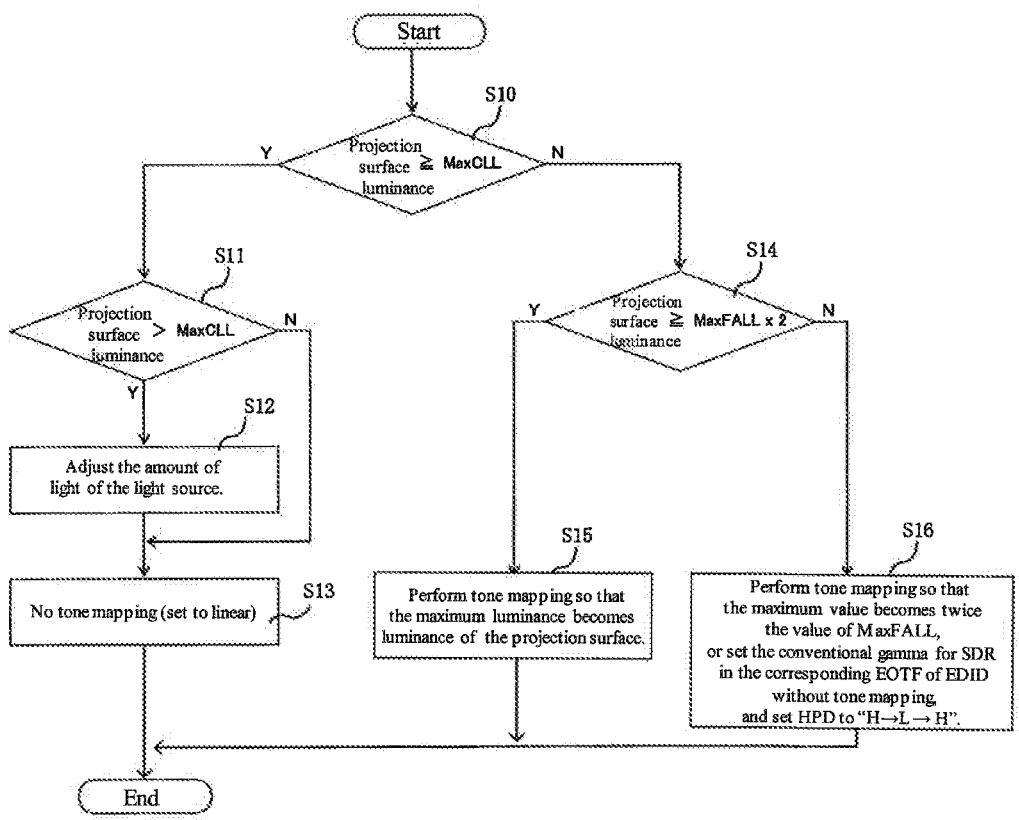

[Fig. 12]
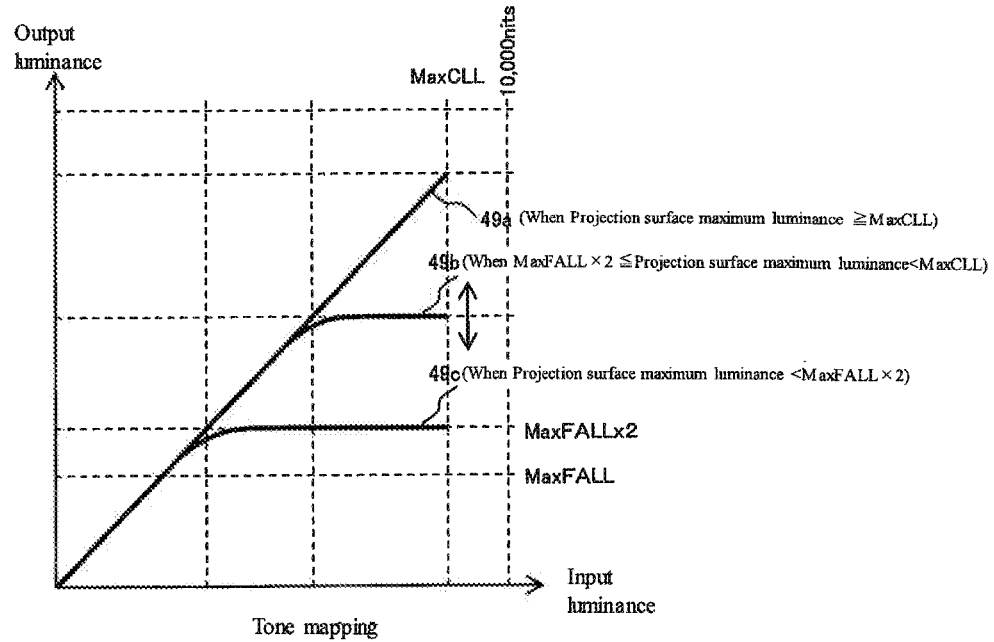
[Fig. 13A]
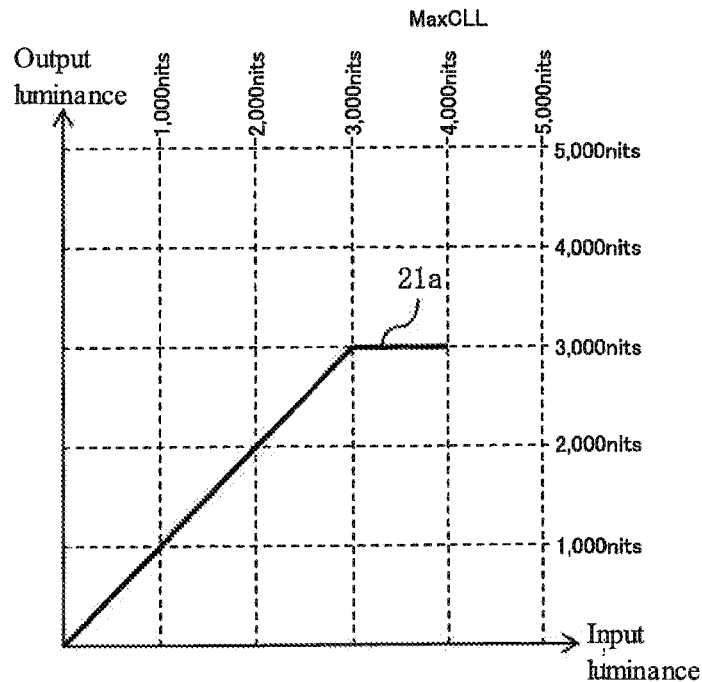

[Fig. 13B]
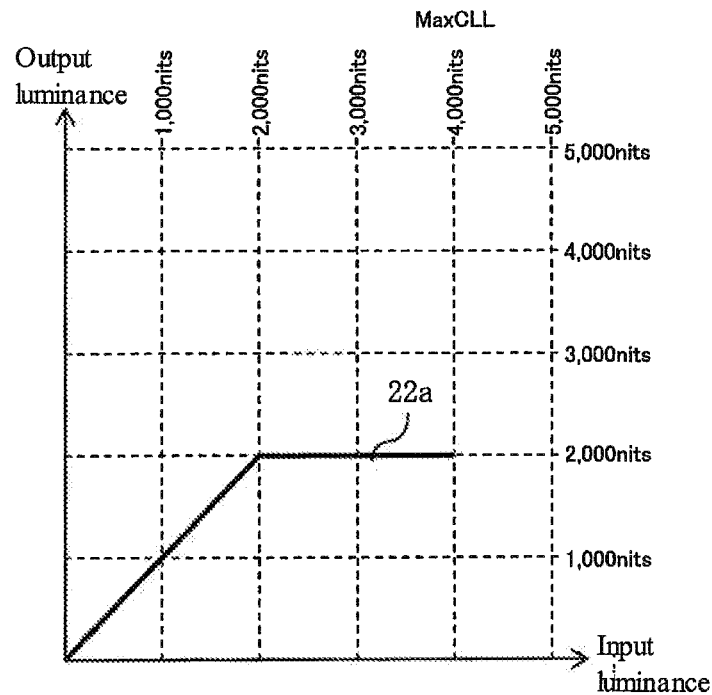
[Fig. 13C]
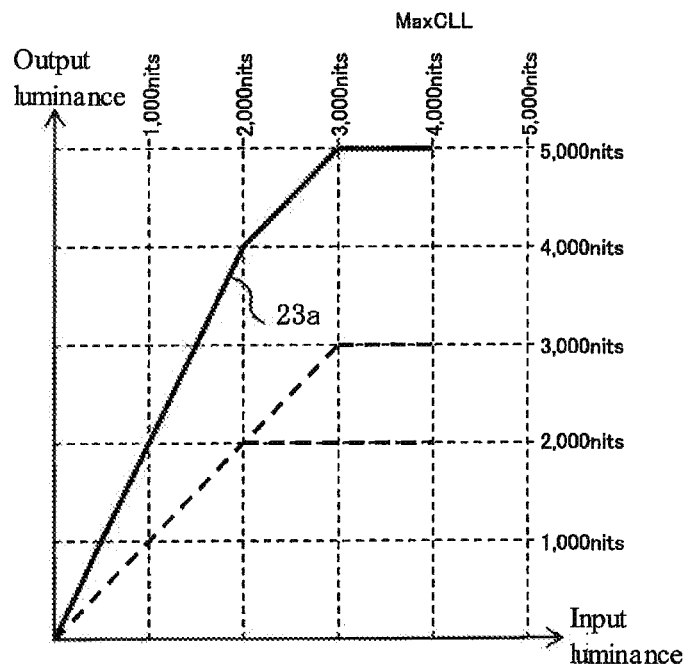

[Fig. 13D]
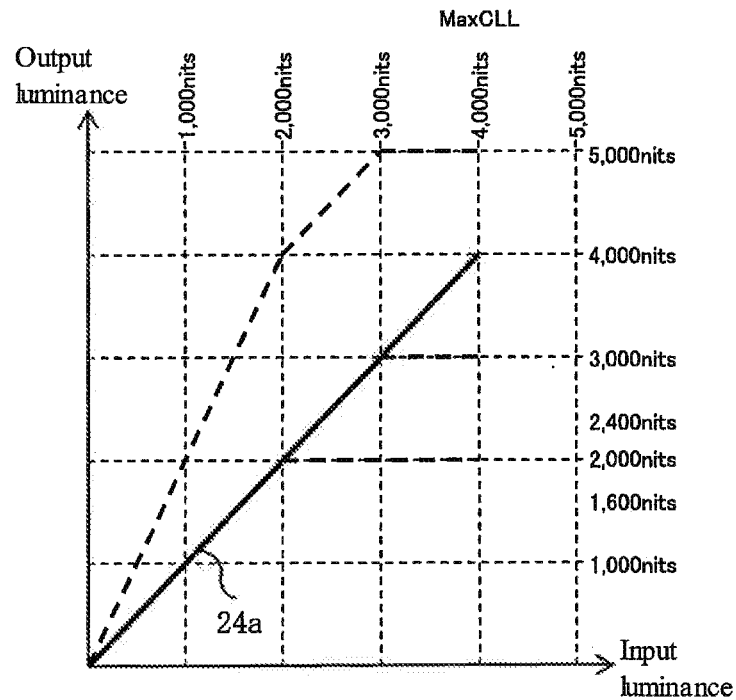
[Fig. 13E]
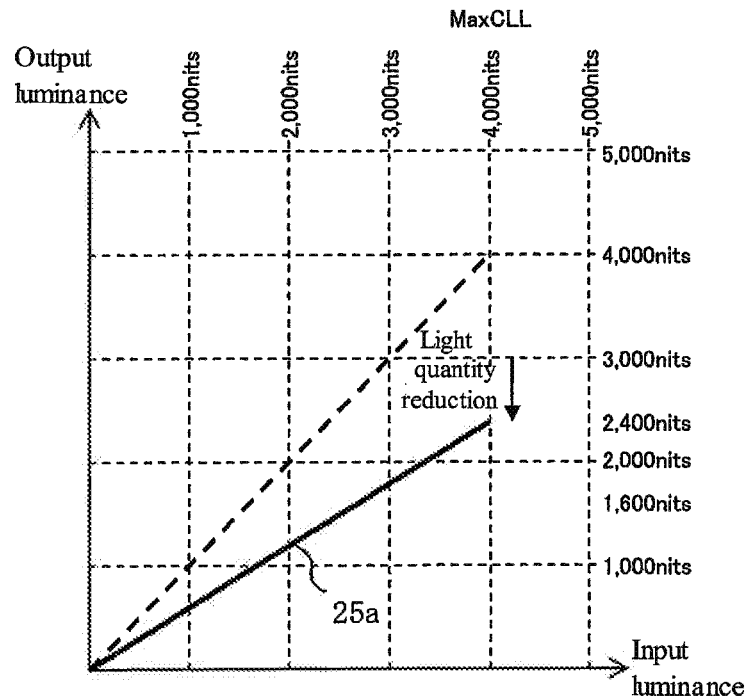

[Fig. 13F]
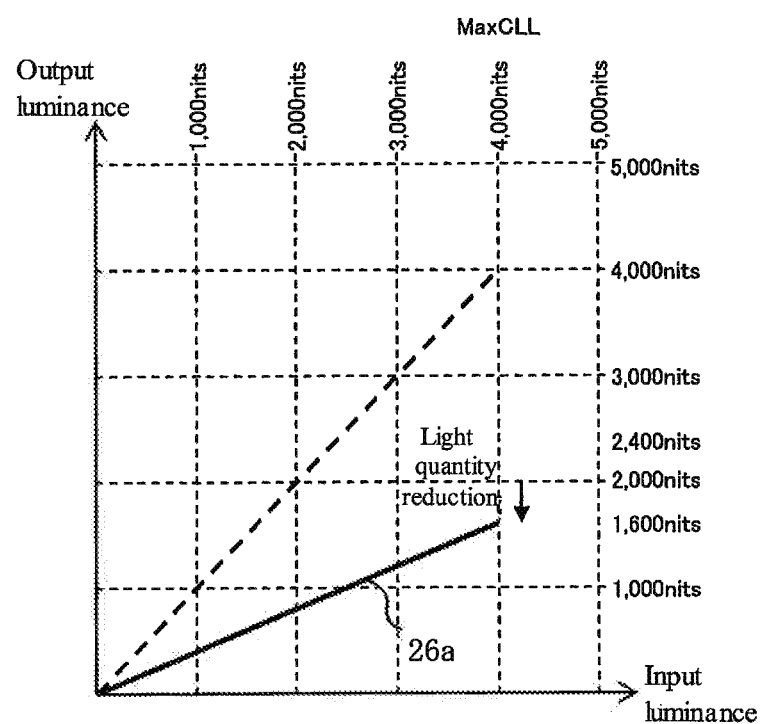

[Fig. 14A]
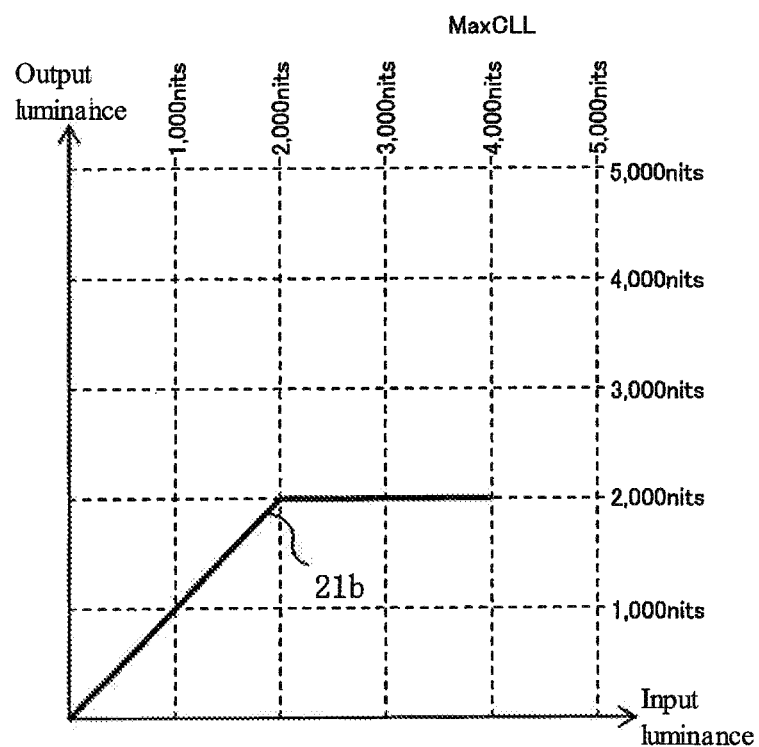

[Fig. 14B]
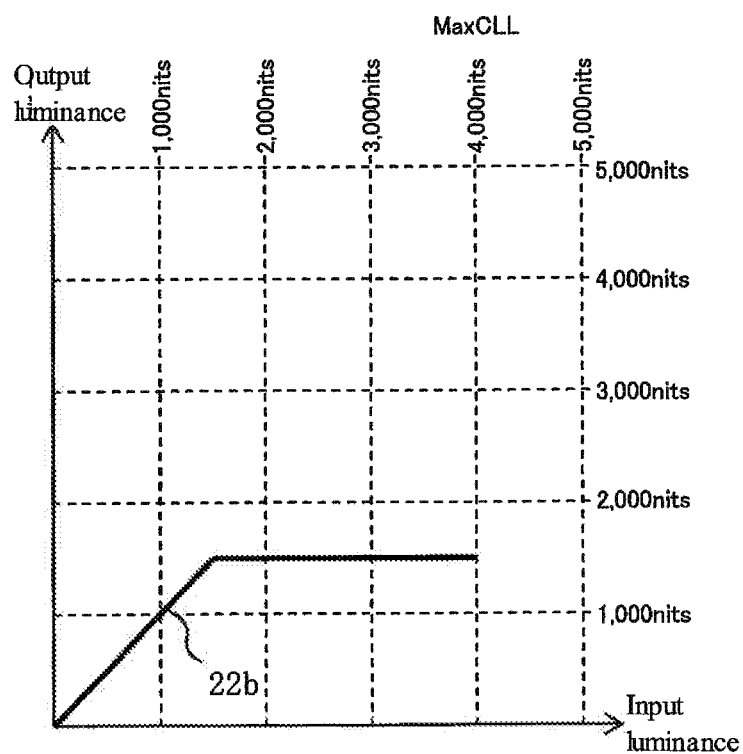

[Fig. 14C]
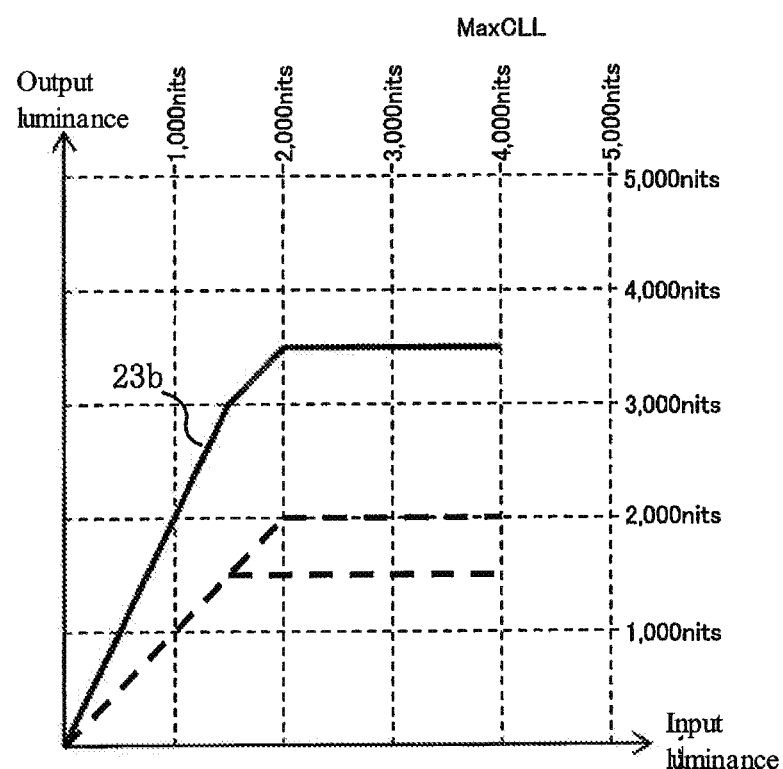

[Fig. 14D]
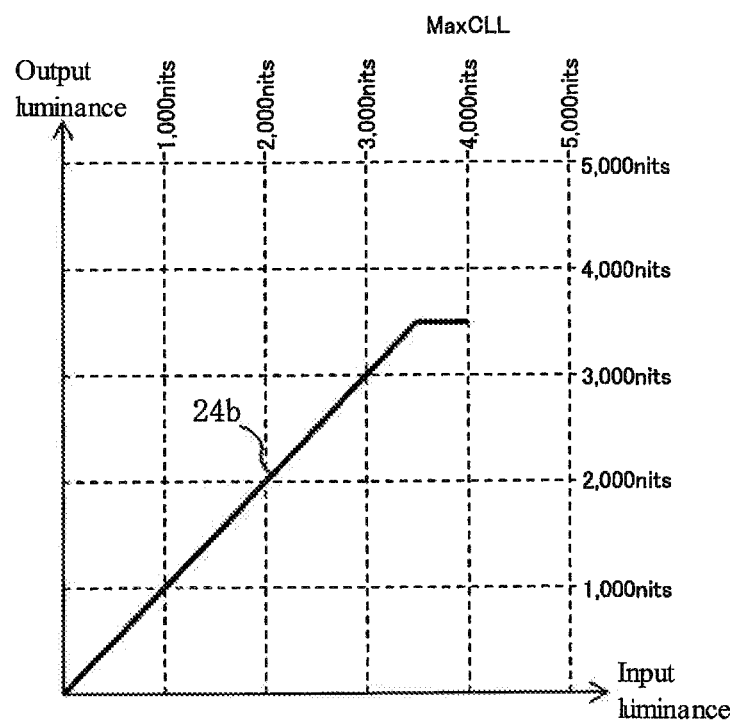

[Fig. 14E]
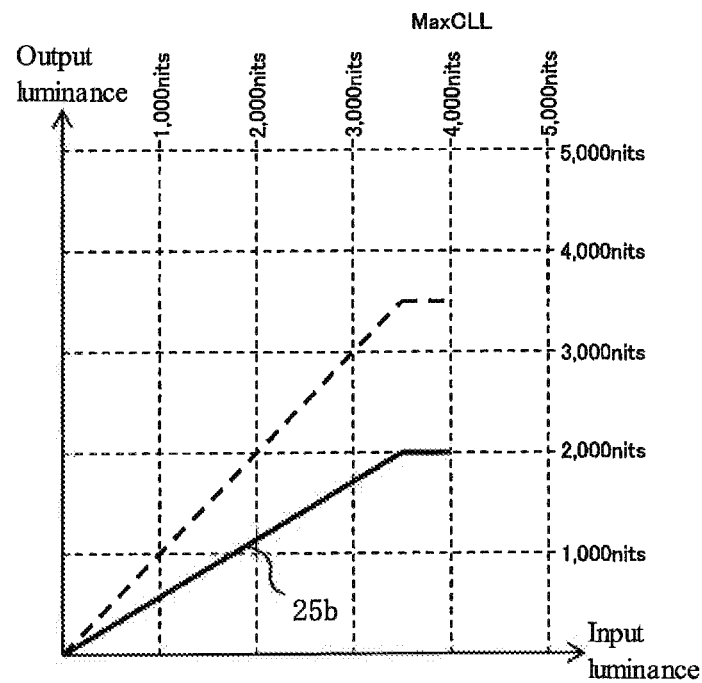
[Fig. 14F]
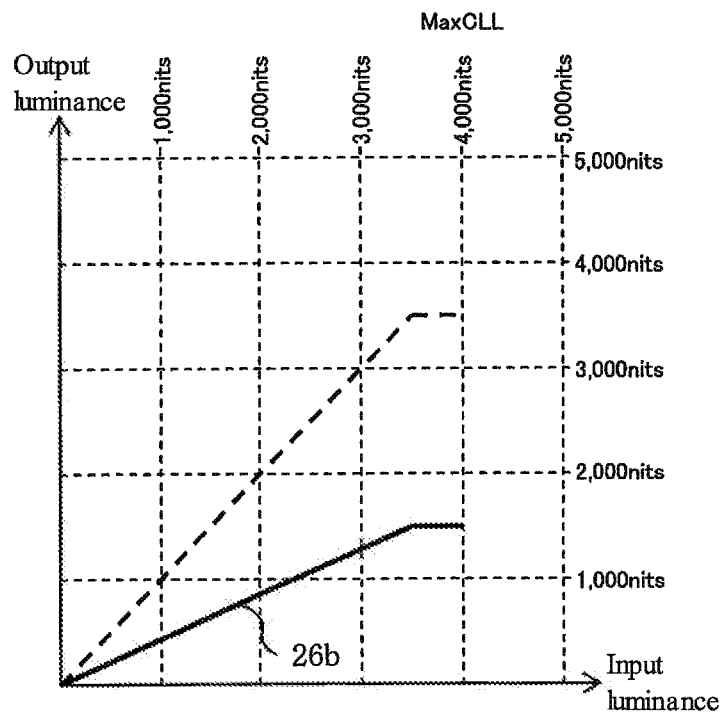

[Fig. 15A]
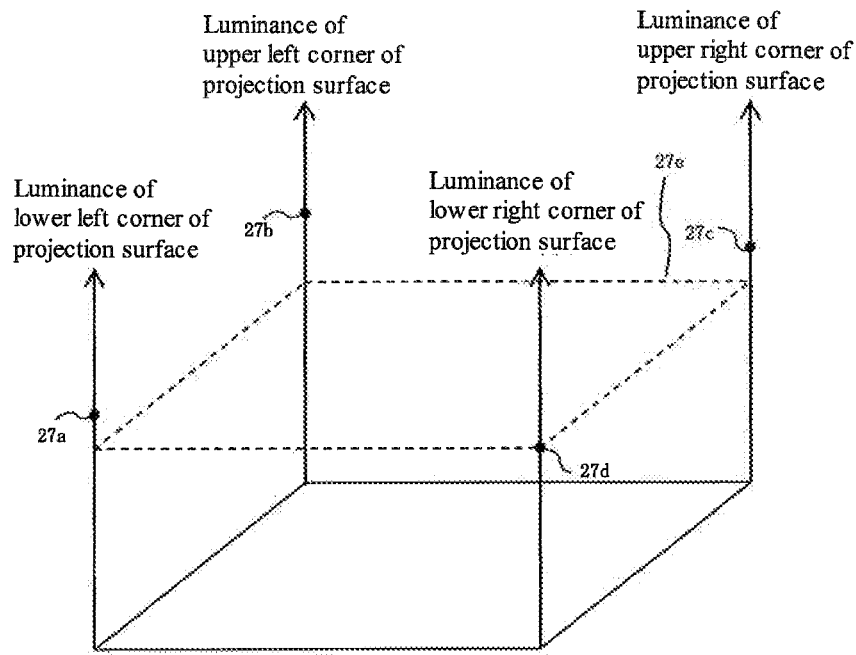
[Fig. 15B]
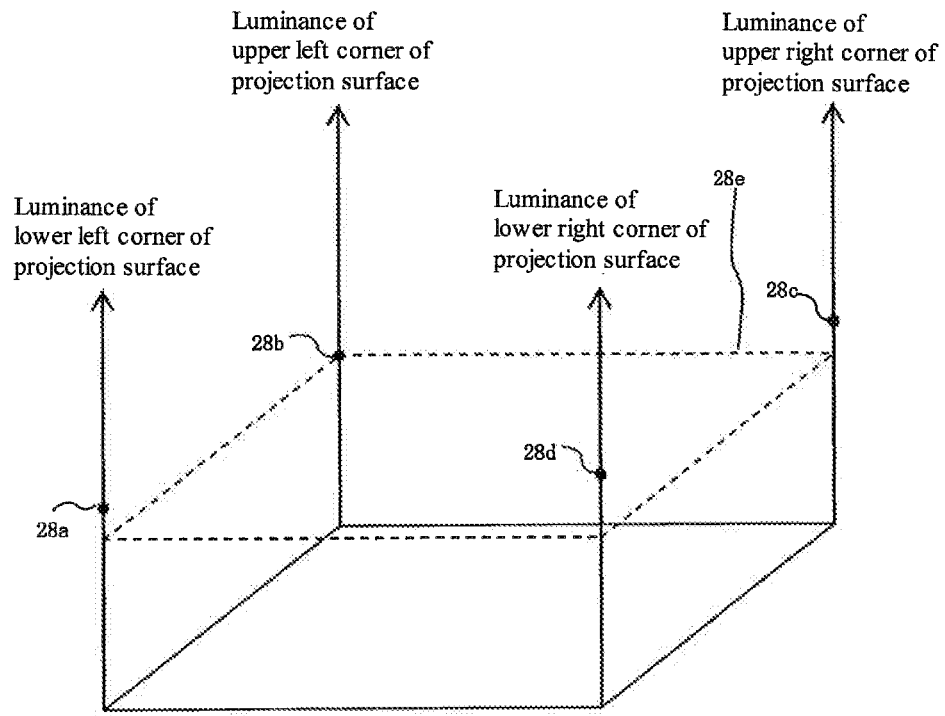

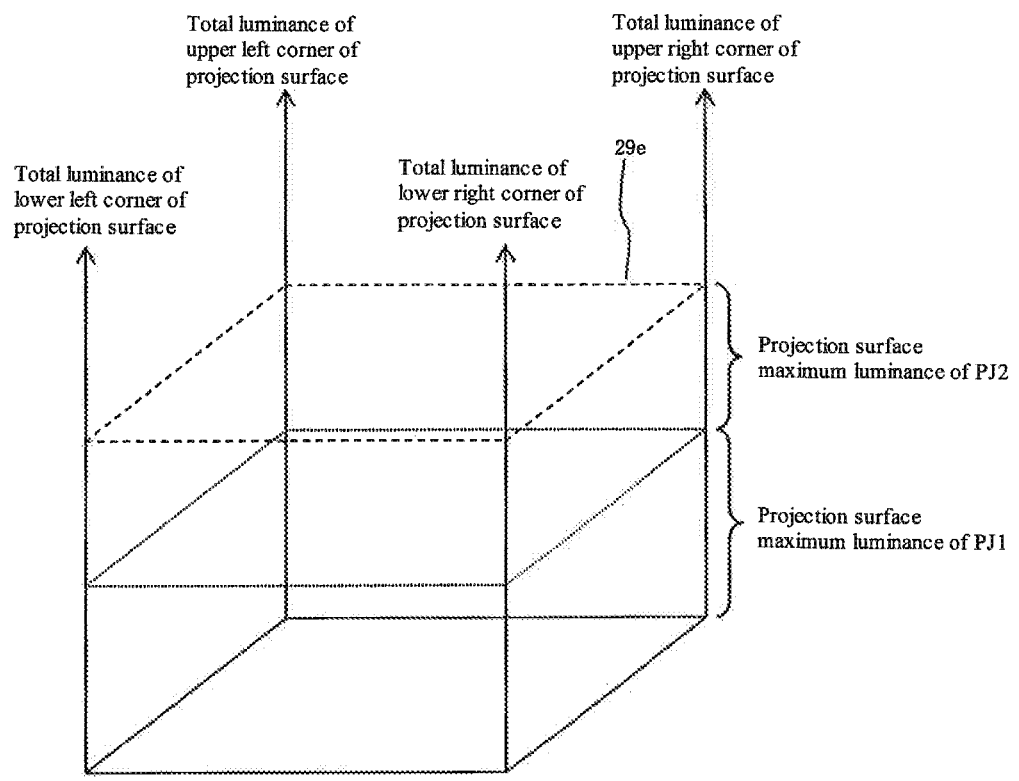
[Fig. 15C]

[Fig. 16]
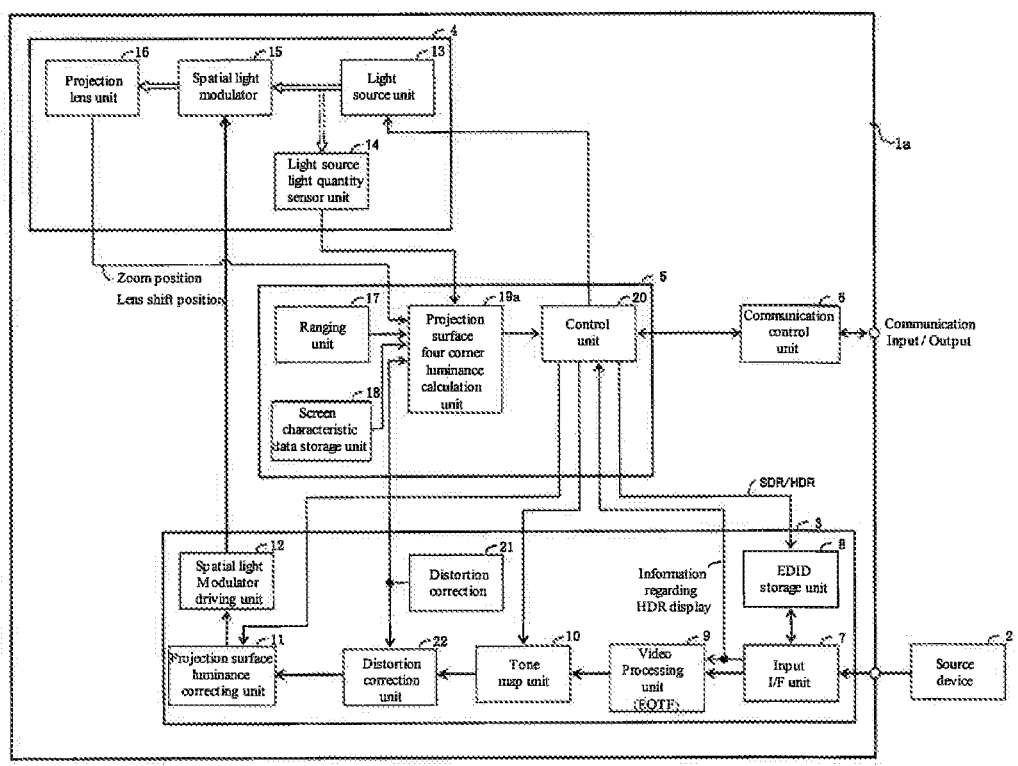

[Fig. 17]
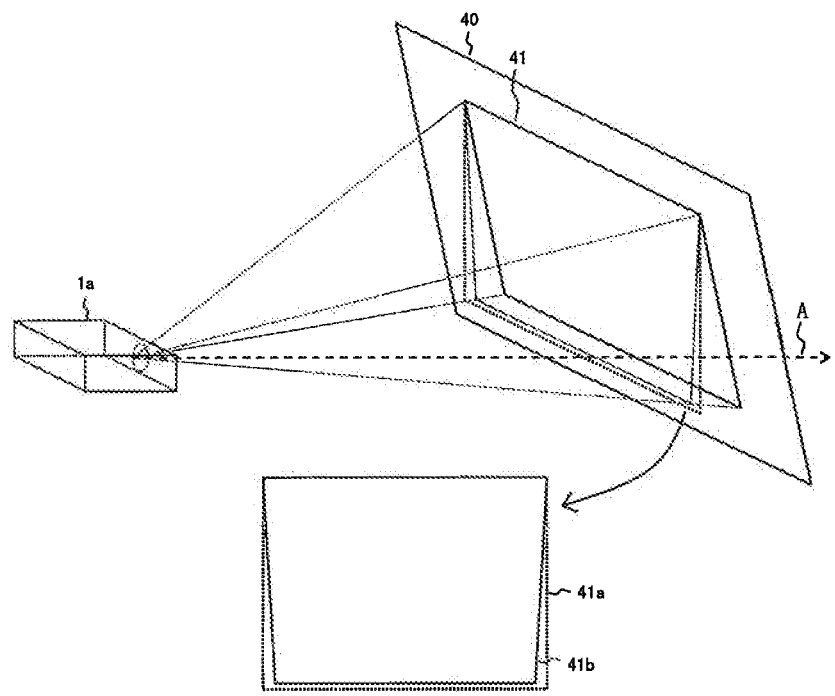

[Fig. 18]
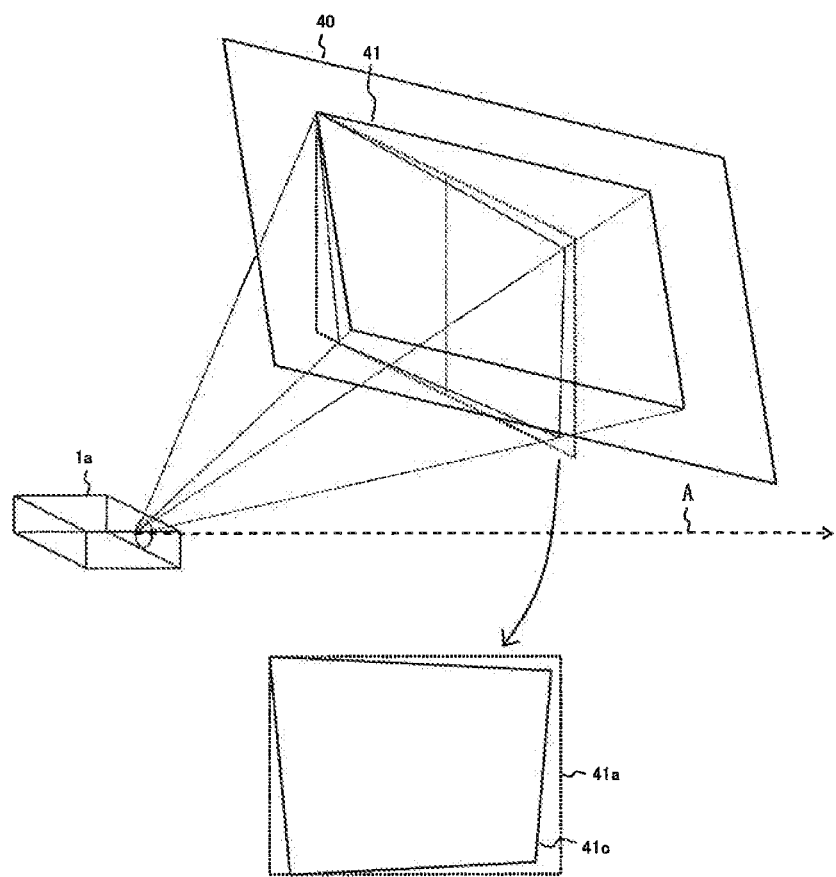

[Fig. 19]
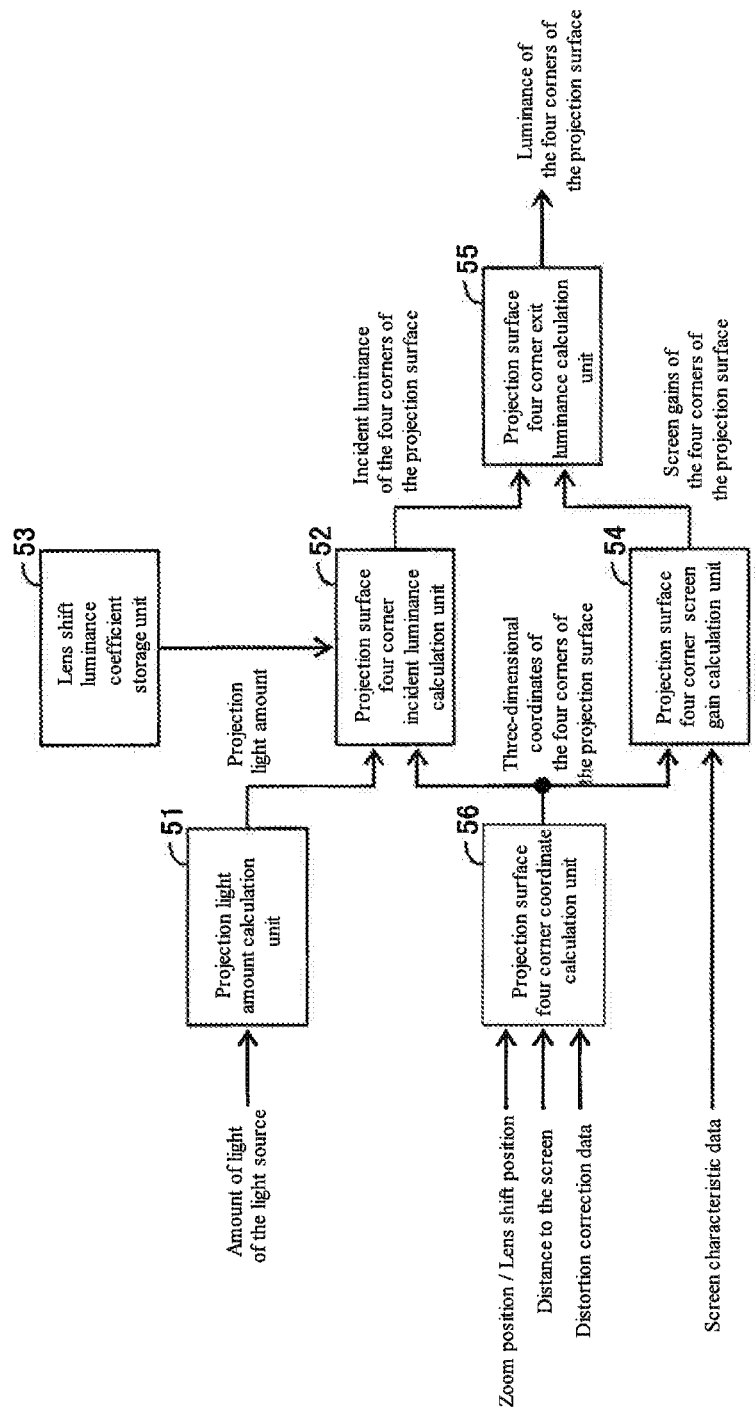

[Fig. 20]
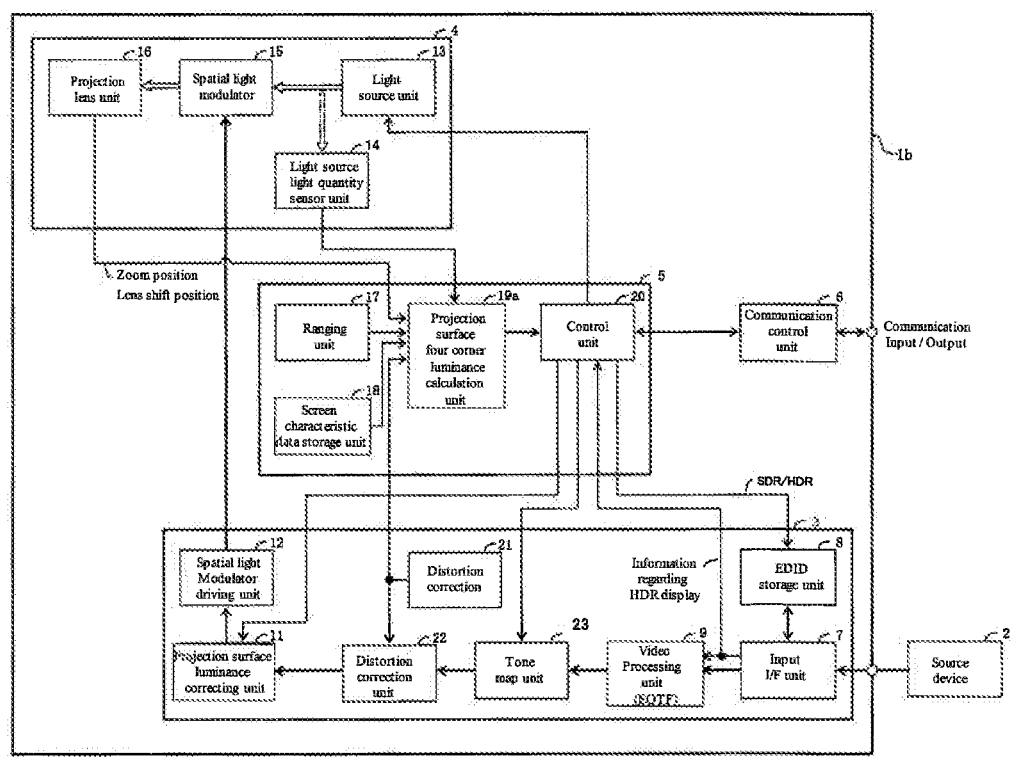

[Fig. 21A]
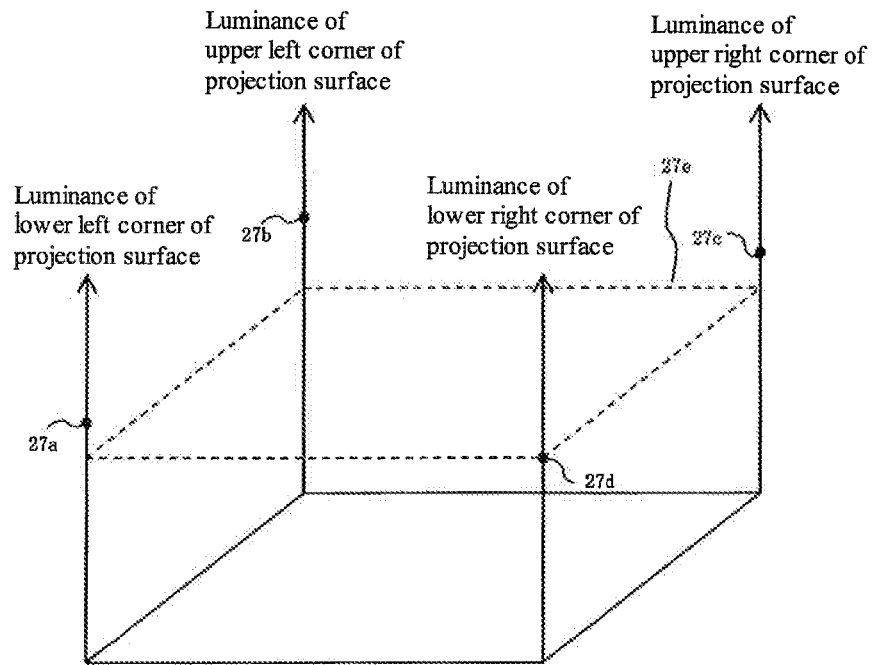
[Fig. 21B]
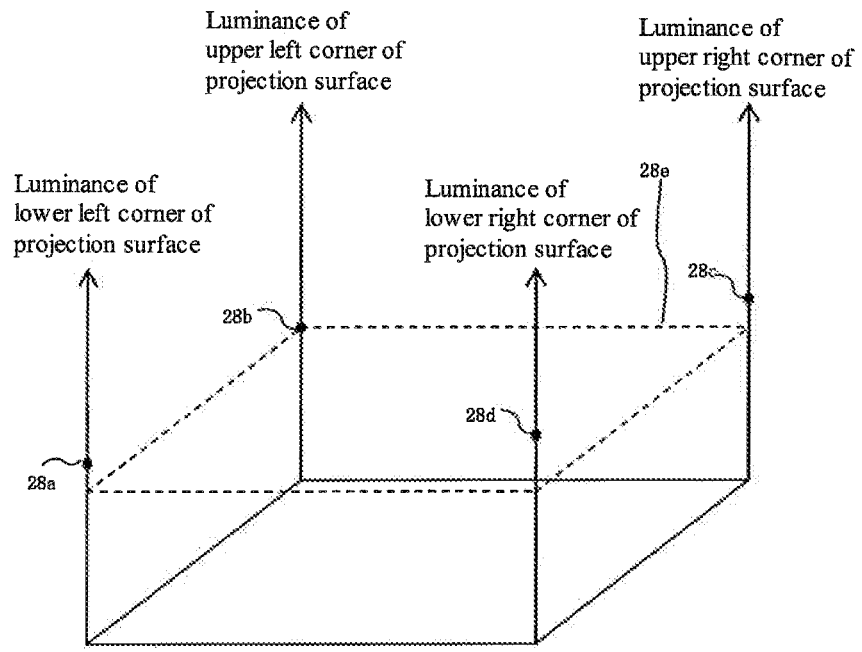

[Fig. 21C]
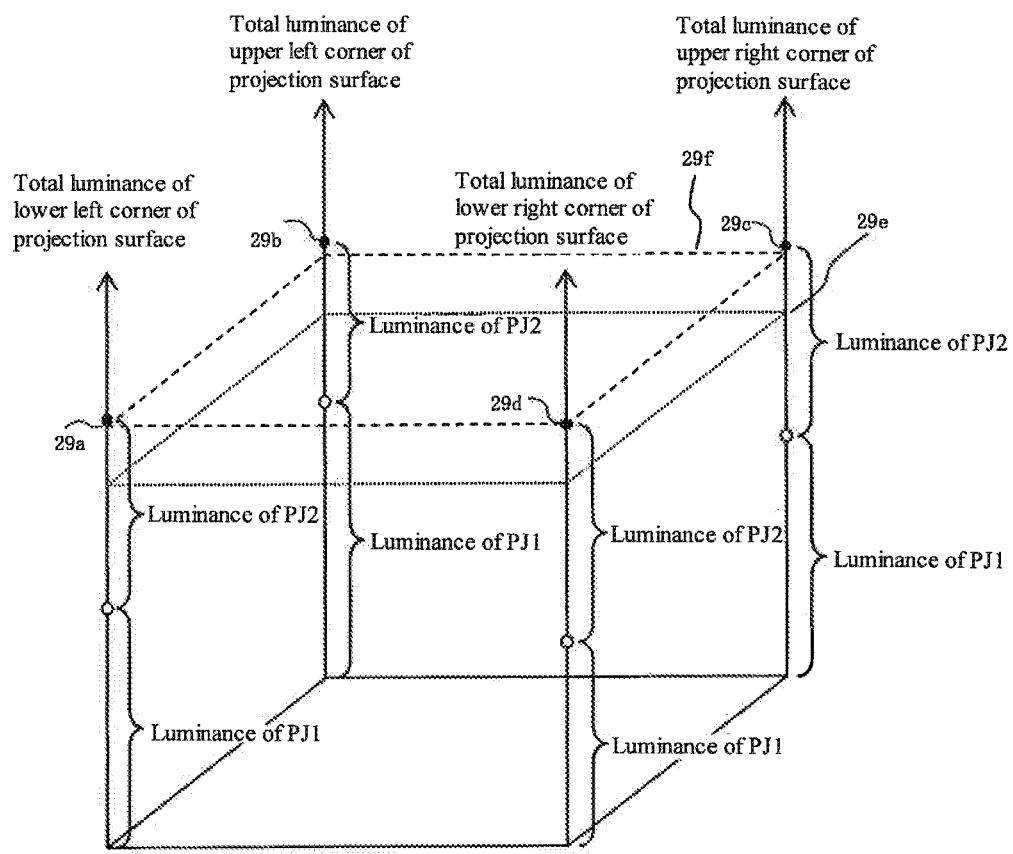

PROJECTOR, STACK DISPLAY SYSTEM, IMAGE DISPLAY METHOD, AND PROGRAM

TECHNICAL FIELD

The present invention relates to a projector, a stack display system, a video display method, and a program.

BACKGROUND ART

Recently, mainly in television, an HDR (High Dynamic Range) display, in which a luminance area is enlarged, has been performed with absolute luminance. For example, in the HDR display of a direct-view display such as a liquid crystal display, the display of the absolute luminance to match the maximum luminance of the display is performed.

The HDR display of the direct view display will be briefly described below.

FIG. 1 is a diagram explaining an HDR display of a direct-view display. In FIG. 1, the vertical axis indicates the luminance (nits) of the display, and the horizontal axis indicates the luminance (nits) of the real-world.

As shown in FIG. 1, the HDR is obtained by expanding 100 nits, which is the highest luminance of the SDR (Standard Dynamic Range), to 10,000 nits, and in this embodiment, an HDR luminance expansion region is added to the SDR luminance region.

FIG. 2 is a block diagram showing an example of a signal processing flow from the camera of the source device to the display of the sink device. Here, "16-bit decimal" means a numeric representation of 16-bit length using floating point, and "10 or 12-bit integer" means a numeric representation of 10-bit or 12-bit length using integers.

Referring to FIG. 2, source device 100 includes camera 101, grading unit 102 and OETF (photoelectric conversion) unit 103. Sink device 200 includes EOTF (electro-optic conversion) unit 201, tone mapping unit 202 and display 203.

In source device 100, grading unit 102 performs grading, which is adjustment of luminance and color, for the output video signal of camera 101. OETF unit 103 performs OETF, which is an inverse EOTF, on the output signal of grading unit 102 to quantize the luminance and convert the output signal into a video data. Here, the output signal of grading unit 102 has linear characteristic 104a. For OETF, characteristic 104b that is defined by a curve whose slope gradually decreases is used. The output video data of OETF unit 103 also has characteristic 104c that is defined by a curve similar to characteristic 104b. Source device 100 transmits, to sink device 200, a video signal that includes the output video data (10 or 12-bit integers) of OETF unit 103, EOTF information, and metadata.

In sink device 200, the output video data of OETF unit 103 and EOTF information are supplied to EOTF unit 201, and the metadata is supplied to tone mapping unit 202. EOTF unit 201 performs inverse quantization by performing EOTF based on EOTF information with respect to the output video data of OETF unit 103. Tone mapping unit 202, with respect to the output signal of EOTF unit 201, performs tone mapping (luminance gradation conversion) in accordance with the maximum luminance of display 203. Display 203 displays an image based on the output video data of tone mapping unit 202. Here, characteristic 204a that is defined by a curve whose slope gradually increases is used for EOTF. The output-signal of EOTF unit 201 has linear characteristic 204b. Tone mapping unit 202 uses tone map 204c that is adjusted so that the maximum value of the output luminance becomes the maximum luminance of display 203.

An EOTF for HDR include a PQ (Perceptual Quantization) curve which is defined by absolute luminance, and a gamma for HDR and HLG (Hybrid Log Gamma) which are defined by relative luminance. On the other hand, as an EOTF for SDR, there is a gamma for SDR which is defined by relative luminance.

The meta-data includes a MaxCLL (Maximum Content Light Level) that indicates the maximum luminance in the contents and a MaxFALL (Maximum Frame-average Light Level) that indicates the maximum value of the intra-frame mean luminance. When the maximum luminance of the display is equal to or higher than the MaxCLL, all the luminance contained in the video data can be expressed. However, when the maximum luminance of the display is less than the MaxCLL, it is not possible to express all of the luminance included in the video data.

FIG. 3 shows an exemplary tone map when the MaxCLL is 4000 nits and the maximum luminance of the display is 500 nits.

In the tone map shown in FIG. 3, the gradation range of the low luminance side (dark side) has a linear gradation characteristic, and the gradation range of the high luminance side (bright portion) has a gradation characteristic that is rounded to the maximum luminance of the display. Here, the gradation characteristics so rounded to the maximum luminance of the display is, for example, a gradation characteristic in which, in a predetermined gradation range, the amount of change in the output luminance is smaller than the amount of change in the input luminance According to this tone map, the dark side can be displayed according to the absolute luminance. On the bright side, the part exceeding the maximum luminance of the display cannot be represented, but the display can be performed with absolute luminance.

As described above, in the direct view display, it is possible to perform the HDR display with absolute luminance.

On the other hand, in the projector, for example, depending on the installation situation, the distance from the projection lens to the screen changes, or the screens whose characteristics (e.g., reflection characteristics) are different from each other are used. In this case, since the luminance of the projection surface changes according to the change in the projection situation, it is difficult to perform the HDR display with absolute luminance.

Therefore, a projector for performing the gradation conversion process of the HDR image in accordance with the luminance of the projection surface has been proposed (see Patent Document 1).

The projector described in Patent Document 1, which is for projecting an HDR image corresponding to an image signal input from an external device, includes a luminance calculation means for calculating the luminance of the projection image according to the projection state and a gradation conversion processing means for performing a gradation conversion process of the HDR image in accordance with the luminance that is calculated by the luminance calculation means. As the projection state, the projection distance and the reflection characteristics of the screen are considered.

LITERATURE OF THE PRIOR ART

Patent Literature

Patent Document 1: Japanese Patent Laid-Open No. 2017-200104

DISCLOSURE OF THE INVENTION

Problems to be Solved by the Invention

However, in the projector described in Patent Document 1, it does not take into account the relationship between the maximum luminance of the projection surface and the maximum luminance of the image data (e.g., MaxCLL). Therefore, when the maximum luminance of the projection surface is larger than the maximum luminance of the image data (e.g., MaxCLL), the tone map must be used to reduce the gradation. In this case, the light source will emit more light than necessary, as a result, the life of the light source is shortened.

An object of the present invention is to provide a projector, a stack display system, an image display method, and a program capable of solving the above problems and extending the life of a light source.

Means for Solving the Problem

In order to achieve the above object, a projector of the present invention includes:

a light source;

a spatial light modulator that modulates light from the light source to emit a modulated light;

a signal processing unit that comprises a tone map unit that performs a luminance gradation conversion of an input video data according to a tone map indicating a relationship of an output luminance with respect to an input luminance and that drives the spatial light modulator based on an output video data of the tone map unit;

a projection lens unit that projects the modulated light on a screen;

a luminance acquiring unit that obtains a maximum luminance of a projection surface of the modulated light; and a control unit that controls an amount of light of the light source and sets the tone map, wherein:

when the maximum luminance of the projection surface is equal to or greater than a first threshold value indicating a maximum luminance of the input video data, the control unit sets, to the tone map unit, a tone map in which a maximum value of the output luminance is set to be the first threshold value, and when the maximum luminance of the projection surface is larger than the first threshold value, the control unit reduces the amount of light of the light source.

A stack display system of the present invention includes a main projector and at least one sub projector, each comprising the above-mentioned projector, wherein the main projector and the sub projector project overlap and project images of each other on a screen, wherein a control unit of the main projector acquires information relating to a maximum luminance of a projection surface acquired by the sub projector and creates a tone map of each of its own projector and the sub projector based on information relating to the maximum luminance of the projection surface acquired by the own projector and information relating to the maximum luminance of the projection surface acquired from the sub projector.

An video display method of the present invention is a video display method performed by a projector that includes a spatial light modulator that modulates light from a light source to emit a modulated light and a tone map unit that performs a luminance gradation conversion of an input video data according to a tone map indicating a relationship of an output luminance with respect to an input luminance, the projector being configured to drive the spatial light modulator based on an output video data of the tone map unit and to project the modulated light on a screen, the method comprising:

obtaining a maximum luminance of a projection surface of the modulated light;

when the maximum luminance of the projection surface is equal to or greater than a first threshold value indicating a maximum luminance of the input video data, setting, to the tone map unit, a tone map in which a maximum value of the input luminance is set to be the first threshold value; and when the maximum luminance of the projection surface is larger than the first threshold value, reducing an amount of light of the light source.

A program of the present invention, which is executed by a computer of a projector that includes a spatial light modulator that modulates light from a light source to emit a modulated light and a tone map unit that performs a luminance gradation conversion of an input video data according to a tone map indicating a relationship of an output luminance with respect to an input luminance, the projector being configured to drive the spatial light modulator based on an output video data of the tone map unit and to project the modulated light on a screen, is configured to cause the computer to execute the steps of:

obtaining a maximum luminance of a projection surface of the modulated light;

when the maximum luminance of the projection surface is equal to or greater than a first threshold value indicating a maximum luminance of the input video data, setting, to the tone map unit, a tone map in which a maximum value of the input luminance is set to be the first threshold value; and when the maximum luminance of the projection surface is larger than the first threshold value, reducing an amount of light of the light source.

BRIEF DESCRIPTION OF THE DRAWINGS

FIG. 1 is a diagram explaining an HDR display of a direct-view display.

FIG. 2 is a block diagram illustrating an example of a signal processing flow from a camera of a source device to a display of a sink device.

FIG. 3 is a diagram illustrating an exemplary tone map when a MaxCLL is 4000 nits and the maximum luminance of the display is 500 nits.

FIG. 4 is a block diagram illustrating a configuration of a projector according to a first example embodiment of the present invention.

FIG. 5 is a block diagram illustrating a configuration of a projector according to a second example embodiment of the present invention.

FIG. 6A is a diagram explaining a characteristic of a diffuse screen.

FIG. 6B is a diagram explaining a characteristic of a regression-type screen.

FIG. 6C is a diagram explaining a characteristic of a reflective screen.

FIG. 7 is a schematic diagram illustrating an example of the storage state of a characteristic data of the screen.

FIG. 8 is a schematic diagram illustrating a state in which the projector is installed so as to face the screen.

FIG. 9 is a block diagram illustrating the configuration of a projection surface four corner luminance calculation unit.

FIG. 10 is a schematic diagram illustrating a projection state when a lens shift operation is performed in a state in which the projector is installed so as to face the screen.

FIG. 11 is a flowchart illustrating a procedure of a tone map creation process.

FIG. 12 is a diagram explaining an example of a tone map created by the tone map creation process.

FIG. 13A is a diagram explaining a tone map of projector PJ1 alone.

FIG. 13B is a diagram explaining a tone map of projector PJ2 alone.

FIG. 13C is a diagram explaining a tone map when the tone maps shown in FIGS. 13A and 13B are stacked.

FIG. 13D is a diagram illustrating a tonal map for the total projection surface luminance of projectors PJ1 and PJ2.

FIG. 13E is a diagram explaining a tone map of projector PJ1 created based on the tone map shown in FIG. 13D.

FIG. 13F is a diagram explaining a tone map of projector PJ2 created based on the tone map shown in FIG. 13D.

FIG. 14A is a diagram explaining a tone map of projector PJ1 alone.

FIG. 14B is a diagram explaining a tone map of projector PJ2 alone.

FIG. 14C is a diagram explaining a tone map when the tone maps shown in FIGS. 14A and 14B are stacked.

FIG. 14D is a diagram illustrating a tonal map for the total projection surface luminance of projectors PJ1 and PJ2.

FIG. 14E is a diagram explaining a tone map of projector PJ1 created based on the tone map shown in FIG. 14D.

FIG. 14F is a diagram explaining a tone map of projector PJ2 created based on the tone map shown in FIG. 14D.

FIG. 15A is a schematic diagram illustrating the luminance of the four corners of the projection surface of projector PJ1 and the projection surface maximal luminance.

FIG. 15B is a schematic diagram illustrating the luminance of the four corners of the projection surface of projector PJ2 and the projection surface maximal luminance.

FIG. 15C is a schematic view illustrating the total projection surface maximum luminance at the time of stack displaying.

FIG. 16 is a block diagram showing a configuration of a projector according to a third example embodiment of the present invention.

FIG. 17 is a schematic diagram illustrating a relationship between a projected image area and a projected image area after distortion correction when projecting an image on a screen that is not facing the projector.

FIG. 18 is a schematic diagram illustrating a relationship between a projected image area and a projected image area after distortion correction when projecting an image on a screen that is not facing the projector.

FIG. 19 is a block diagram illustrating the configuration of a projection surface four corner luminance calculation unit.

FIG. 20 is a block diagram illustrating a configuration of a projector according to a fourth example embodiment of the present invention.

FIG. 21A is a schematic diagram illustrating the luminance of the four corners of the projection surface of projector PJ1 and the projection surface maximal luminance.

FIG. 21B is a schematic diagram illustrating the luminance of the four corners of the projection surface of projector PJ2 and the projection surface maximal luminance.

FIG. 21C is a schematic view illustrating the total projection surface maximum luminance at the time of stack displaying.

EXAMPLE EMBODIMENTS

Next, example embodiments of the present invention will be described with reference to the drawings.

First Example Embodiment

FIG. 4 is a block diagram showing a configuration of a projector according to the first example embodiment of the present invention.

Referring to FIG. 4, the projector includes control unit 30, light source 31, spatial light modulator 32, projection lens unit 33, luminance acquiring unit 34 and signal processing unit 36.

Spatial light modulator 32 modulates light from light source 31, and emits a modulated light. Signal processing unit 36 includes tone map unit 35 that performs the luminance gradation conversion of an input video data according to the tone map that indicates the relationship of the output luminance with respect to the input luminance, and drives spatial light modulator 32 based on the output video data of tone map unit 35. Projection lens unit 33 projects the modulated light on screen 37. Luminance acquiring unit 34 acquires the maximum luminance of the projection surface of the modulated light.

Control unit 30 controls the amount of light of light source 31, and sets the tone map. When the maximum luminance of the projection surface is equal to or greater than the first threshold value that indicates the maximum luminance of the input video data, control unit 30 sets, to tone map unit 35, the tone map that is set so that the maximum value of the output luminance becomes the first threshold value. When the maximum luminance of the projection surface is greater than the first threshold value, control unit 30 reduces the amount of light of light source 31.

According to the projector of the present example embodiment, since the maximum luminance of the projection surface is acquired and the tone map is set according to the maximum luminance, it is possible to perform a HDR display according to the projection situation.

In addition, since the relationship between the maximum luminance of the projection surface and the maximum luminance of the video data (e.g., MaxCLL) is taken into account to create the tone map corresponding to the maximum luminance of the input video data, the tone map suitable for the input video data can be set.

Furthermore, when the maximum luminance of the projection surface is greater than the maximum luminance of the video data (e.g., MaxCLL), since the amount of light of light source 31 is reduced, it is possible to prevent the emission of more light amount than required. As a result, the life of light source 31 can be extended.

Second Example Embodiment

FIG. 5 is a block diagram indicating a configuration of a projector according to the second example embodiment of the present invention. In FIG. 5, a unidirectional arrow is a brief indication of the direction of flow of a signal (e.g., data, information, etc.) and does not preclude bi-directionality.

Referring to FIG. 5, projector 1 includes signal processing unit 3, projection unit 4, HDR display control unit 5 and communication control unit 6. Signal processing unit 3 receives the video signal from source device 2 and processes the video signal. Projection unit 4 projects the image processed by signal processing unit 3. HDR display control unit 5 controls the operation of each of signal processing unit 3 and projection unit 4 and can, for example, perform the HDR display.

When performing a display operation in conjunction with another projector such as stack display, communication control unit 6 can mutually communicate with the other projector to exchange necessary data.

Signal processing unit 3 includes input interface (I/F) unit 7, EDID storage unit 8, video processing unit 9, tone map unit 10, projection surface luminance correcting unit 11 and spatial light modulator driving unit 12.

EDID storage unit 8 holds information such as a EDID.

Input I/F unit 7 receives a video signal from source device 2. The video signal from source device 2 includes video data and HDR-related information (e.g., EOTF information and metadata, etc). Input I/F unit 7 acquires video data and information on HDR display from the received video signal. Input I/F unit 7 supplies the video data to video processing unit 9, and supplies information regarding the HDR display to video processing unit 9 and HDR display control unit 5.

Furthermore, input I/F unit 7 functions as an I/F for EDID storage unit 8. For example, source device 2 can access EDID storage unit 8 via input I/F unit 7.

Video processing unit 9 performs an EOTF process on the video data from input I/F unit 7 based on EOTF information included in the HDR-related information acquired by input I/F unit 7. For the video data to which the EOTF process is performed, image processing unit 9 also performs a resolution conversion process to convert the resolution of the image indicated by the video data to the resolution of the display device of projector 1, an image quality adjustment process to adjust the image quality of the image, and the like.

Tone map unit 10 performs the tone mapping (luminance gradation conversion) according to the tone map for the output video data of video processing unit 9.

Projection surface luminance correcting unit 11 adjusts the gain of each pixel of the output video data of tone map unit 10 in order to correct the unevenness of the luminance of the projection surface.

Spatial light modulator driving unit 12, based on the output video data of projection surface luminance correcting unit 11, generates a drive signal to drive the spatial light modulator of projection unit 4.

Projection unit 4 includes light source unit 13, light source light quantity sensor unit 14, spatial light modulator 15 and projection lens unit 16.

Light source unit 13 generates illumination light. As a light source of light source unit 13, for example, a light source comprising a solid-state light source such as LEDs (Light Emitting Diode) or LDs (Laser Diode), a light source in which a phosphor and a solid-state light source are combined, or the like can be used. Since light source unit 13 is commonly known, a detailed description of light source unit 13 is omitted.

Light source light quantity sensor unit 14 measures the amount of illumination light emitted from light source unit 13. Any optical sensor may be used as long as the amount of illumination light can be measured.

Spatial light modulator 15 optically modulates the illumination light from light source unit 13 in accordance with the drive signal from spatial light modulator driving unit 12. Spatial light modulator 15 includes, for example, a spatial light modulator such as a DMD (Digital Micromirror Device) or a liquid crystal display device.

Projection lens unit 16 is an example of a projection lens unit. Projection lens unit 16 includes a projection lens for projecting the emitted light (modulated light) of spatial light modulator 15 on a screen (not shown). Projection lens unit 16 includes a zoom lens unit in which at least a portion of the projection lens moves in the optical axis direction, and a lens shift unit in which the lens group of the entire projection lens moves in a direction perpendicular to the optical axis. Projection lens unit 16 supplies, to HDR display control unit 5, information indicating the zoom position of the zoom lens unit and information indicating the lens shift position of the lens shift unit. The information indicating the zoom position includes the movement direction and the amount of movement of the zoom lens in the optical axis direction. The information indicating the lens shift position includes the movement direction and the amount of movement of the lens group.

HDR display control unit 5 includes ranging unit 17, screen characteristic data storage unit 18, projection surface four corner luminance calculation unit 19, and control unit 20.

Ranging unit 17 measures the distance from the projection lens of projection lens unit 16 to the screen. As ranging unit 17, for example, a distance sensor of TOF (Time of Flight) type, a distance sensor of the triangulation method and the like can be used. The TOF system measures the distance based on the time until projected light is reflected by an object and returns after the light is projected. The triangulation system is a system in which light is projected, light reflected by an object is detected, and the distance is measured using the principle of triangulation from the detection position of the reflected light.

Screen characteristic data storage unit 18 stores characteristic data of a plurality of types of screens. Characteristic data of the screen is, for example, characteristic data indicating the gain of exit light with respect to incident light (e.g., reflection characteristic data). For example, the user can designate the characteristic data of the screen using an input operation unit (not shown).

As an example of a screen, characteristics of a diffusion type screen, a regression type screen, and a reflection type screen will be briefly described below.

FIG. 6A schematically illustrates the properties of a diffusion type screen. Diffusion type screen 40A shown in FIG. 6A substantially uniformly diffuse reflects incident light 44a in all directions (360 degrees). The diffuse reflected light is exit light 45a of diffusion type screen 40A.

FIG. 6B schematically illustrates the properties of a regression type screen. Regression type screen 40B shown in FIG. 6B reflects incident light 44b in the incident direction. The reflected light is exit light 45b of regression type screen 40B.

FIG. 6C schematically illustrates the properties of a reflection type screen. Reflection type screen 40C shown in FIG. 6C reflects incident light 44c in a direction that is opposite to the incident side and that intersects the incident direction. The reflected light is exit light 45c of reflection type screen 40C.

Screen characteristic data storage unit 18 stores characteristic data of each screen. Here, the characteristic data is defined by the gain distribution of exit light with respect to incident light, for example, the gain of the exit light in the normal direction of the screen with respect to the incident light incident at various angles. For example, as shown in FIG. 7, screen characteristic data storage unit 18 stores characteristic data 46a indicating the gain of exit light 45a with respect to incident light 44a of diffusion type screen 40A, characteristic data 46b indicating the gain of exit light 45b with respect to incident light 44b of regression type screen 40B, and characteristic data 46c indicating the gain of exit light 45c with respect to incident light 44c of reflection type screen 40C.

Reference is again made to FIG. 5.

Projection surface four corner luminance calculation unit 19 is an example of a luminance acquiring unit. Projection surface four corner luminance calculation unit 19 calculates the luminance of the four corners of the projection surface of modulated light based on the amount of light from the light source measured by light source light quantity sensor unit 14, the information of the zoom position and lens shift position from projection lens unit 16, the distance to the screen measured by ranging unit 17, and the characteristic data of the specified screen that is stored in screen characteristic data storage unit 18.

Control unit 20 calculates the coefficient of the tone map based on the luminance of the four corners of the projection surface that is calculated by projection surface four corner luminance calculation unit 19 and the metadata included in information regarding the HDR display from input I/F unit 7. Control unit 20 sets the calculated coefficient to tone map unit 10. Control unit 20 adjusts the light amount of light source unit 13, and rewrites EOTF data of EDID stored in EDID storage unit 8. Control unit 20 generates a coefficient for correcting the luminance of the projection surface from the luminance of the four corners of the projection surface, and sets the generated coefficient to projection surface luminance correction unit 11.

When performing stack display, control unit 20 can mutually communicate with other projectors connected using communication means via communication control unit 6, and can exchange data necessary for stack display with other projectors. For example, if the own projector is the main projector, control unit 20 may acquire the maximum luminance of the projection surface from another projector that is the sub projector, calculate the coefficient of the tone map for the sub projector, and transmit the calculated result, the maximum luminance of the tone map, and information of EOTF of EDID to the sub projector.

Next, the operation of projector 1 of the present example embodiment will be described. Here, it is assumed that projector 1 is installed so as to face the screen.

FIG. 8 schematically indicates a state in which projector 1 is installed so as to face the screen.

Referring to FIG. 8, projector 1 faces screen 40 and projects an image (modulated light) on screen 40. On screen 40, projection surface 41 of the image (modulated light) is formed. Projection surface 41 has a substantially rectangular shape. Viewpoint 43 is positioned to face the center of projection surface 41.

Projector 1 includes distance sensor 17a. Distance sensor 17a is disposed toward the projection direction. One point on screen 40 is ranging measurement point 42. Ranging measurement point 42 does not coincide with the center of projection surface 41. Distance sensor 17a measures the distance from the projection lens to ranging measurement point 42 on screen 40. Straight line connecting distance sensor 17a and ranging measurement point 42 is parallel to lens center axis A of the projection lens. Lens center axis A can be defined by a straight line that passes through the center point of the lens surface (e.g., the exit surface of the lens located on the screen 40 side) and that is perpendicular to the contact plane at the point.

Distances D1-D4 in the direction of lens center axis A between the projection lens and the four corners of projection surface 41 are the same.

Next, the operation of each unit of signal processing unit 3, projection unit 4, HDR display control unit 5, and communication control unit 6 of projector 1 will be briefly described.

In signal processing unit 3, first, input interface (I/F) unit 7 acquires information (EOTF, meta data) relating to the HDR display included in the video signal from the source device. Next, video processing unit 9 performs EOTF on the video data from input interface 7, and performs a resolution conversion, an image quality adjustment, and the like. Next, tone map unit 10 performs tone mapping (luminance gradation conversion) on the output video data of video processing unit 9. Next, projection surface luminance correcting unit 11 performs a projection surface luminance correction for the output video data of tone map unit 10. Then, spatial light modulator driving unit 12, based on the output video data of projection surface luminance correcting unit 11, generates a drive signal for driving the spatial light modulator of projection unit 4.

In projection unit 4, light source unit 13 emits illumination light. In spatial light modulator 15, the spatial light modulator modulates the illumination light from light source unit 13 in accordance with the drive signal from spatial light modulator driving unit 12. In projection lens unit 16, the projection lens projects the modulated light from the spatial light modulator on screen 40. Further, light source light quantity sensor unit 14 measures the amount of illumination light from light source unit 13.

In HDR display control unit 5, ranging unit 17 measures the distance from the projection lens to screen 40. Next, projection surface four corner luminance calculation unit 19 calculates the luminance of the four corners of projection surface 41 based on the amount of light from the light source measured by light source light quantity sensor unit 14, the zoom position and lens shift position of the projection lens, and the characteristic data of the screen specified by the user. Then, control unit 20 calculates the coefficient of the tone map based on the luminance of the four corners of projection surface 41 calculated by projection surface four corner luminance calculation unit 19 and the metadata included in information regarding the HDR display from input interface (I/F) unit 7, and sets the coefficient to signal processing unit 3. Further, control unit 20, based on the luminance of the four corners of projection surface 41 and the metadata, adjusts the amount of light from the light source of projection unit 4. Furthermore, control unit 20, by rewriting the information of EOTF of the EDID stored in signal processing unit 3, performs the HDR display with absolute luminance. When the projection surface maximum luminance is too low, control unit 20 switches from the HDR display to the SDR display. When the projection surface maximum luminance is too high, control unit 20 reduces the amount of light form the light source. Furthermore, the control unit 20, based on the luminance of the four corners of projection surface 41, generates a luminance correction coefficient for uniformizing the luminance of projection surface 41, and sets the coefficient to projection surface luminance correction unit 11.

In the stack display, control unit 20 can control the display operation in the main projector mode and the display operation in the sub projector mode, respectively. The user can set the stack display mode (including setting the main projector mode and the sub projector mode) by an input operation unit (not shown).

In the main projector mode, control unit 20 acquires the projection surface maximum luminance of the sub projector through communication control unit 6. Control unit 20 creates a tone map of each projector based on the projection surface maximum luminance of the main projector and the projection surface maximum luminance of the sub projector. In addition, control unit 20 transmits, to the sub projector, the tone map and information of EOTF of the EDID and the like.

In the sub projector mode, control unit 20 acquires the projection surface maximum luminance of its own projector in response to a request from the main projector and transmits the acquired projection surface maximum luminance to the main projector. Control unit 20 sets the tone map received from the main projector to tone map unit 10 of the own projector.

Further, in each of the main projector mode and the sub projector mode, control unit 20 may generate a coefficient for correcting the luminance of the projection surface from the luminance of the four corners of the projection surface. Then, control unit 20 can set the generated coefficient to projection surface luminance correction unit 11.

According to the main projector mode and the sub projector mode described above, even in the stack display, each projector can perform the HDR display with absolute luminance. Further, each projector switches from the HDR display to the SDR display when the projection surface maximum luminance is too low, and decreases the amount of light of the light source when the projection surface maximum luminance is too high. Each projector also generates a coefficient for correcting the luminance of the projection surface from the luminance of the four corners of the projection surface, and uniformizes the luminance of the projection surface according to the coefficient.

Next, the operation of each unit of signal processing unit 3, projection unit 4, HDR display control unit 5 and communication control unit 6 will be described in detail.

First, the operation of signal processing unit 3 will be described in detail.

When source device 2 is connected to projector 1, source device 2 accesses EDID storage unit 8 via input I/F unit 7. Source device 2 uses a DDC (Display Data Channel) bus independent of the video signal to read out, from EDID storage unit 8, EDID (Extended Display Identification Data) that corresponds to projector 1 and that includes information of resolution and EOTF data. Then, source device 2 outputs, to projector 1, a signal of resolution and EOTF that are suitable for projector 1.

The reading of EDID by source device 2 is realized by setting the HPD (Hot Plug Detect) signal, which indicates that EDID can be read from projector 1 to source device 2, to a high level. Normally, the HPD signal is set to a high level. When the HPD signal is at the low level, since EDID cannot be read out, source device 2 does not output an image. In this example embodiment, since projector 1 performs the HDR display with absolute luminance, the PQ curve is set as the corresponding EOTF information of the above EDID.

When source device 2 outputs a video signal, input I/F unit 7 acquires information (EOTF, meta-data) related to the HDR-display included in the video signal. Video processing unit 9 performs an EOTF process on the video data based on the EOTF information acquired by input I/F unit 7, and further performs a process such as a resolution conversion and an image quality adjustment.

Next, tone map unit 10 performs tone mapping (luminance gradation conversion) according to the coefficient of the tone map set by control unit 20. Next, projection surface luminance correcting unit 11 adjusts the luminance of the projection surface according to the coefficient of the luminance correction of the projection surface set by control unit 20. Then, spatial light modulator driving unit 12 generates a spatial light modulator drive signal for driving the spatial light modulator based on the video data in which the luminance from projection surface luminance correcting unit 11 is adjusted.

Next, the operation of projection unit 4 will be described in detail.

Light source unit 13 generates illumination light according to the drive signal from control unit 20. Light source light quantity sensor unit 14 measures the amount of illumination light emitted by light source unit 13, and spatial modulation unit 15 modulates the illumination light from light source 13 in accordance with the spatial light modulator drive signal from signal processing unit 3. Light source light quantity sensor unit 14 supplies a signal indicating the measurement result of the amount of light to HDR display control unit 5.

Projection lens unit 16 projects an image (modulated light) from spatial modulation unit 15 on the screen. The user uses an input operation unit (not shown) to perform the zoom adjustment and lens shift adjustment in projection lens unit 16. In accordance with the operation of the zoom adjustment and lens shift adjustment of the user, projection lens unit 16 supplies information indicating the zoom position and lens shift position to HDR display control unit 5.

Next, the operation of HDR display control unit 5 will be described in detail.

The user specifies characteristic data of the screen by using an input operation unit (not shown). The specification of the characteristic data of the screen is performed at an arbitrary timing in the period from the start of projector 1 until the luminance calculation by projection surface four corner luminance calculation unit 19 is started. In response to the designation of the screen characteristic data by the user, projection plane four corner luminance calculation unit 19 acquires the designated screen characteristic data from screen characteristic data storage unit 18.

In addition, distance measuring unit 17 measures the distance to the screen. Then, projection surface four corner luminance calculation unit 19 calculates the luminance of the four corners of the projection surface based on the distance measured by the ranging unit 17, the amount of light of the light source measured by light source light quantity sensor unit 14, information of the zoom position and lens shift position from projection lens unit 16 and the screen characteristic data acquired from screen characteristic data storage unit 18.

Hereinafter, the configuration of projection surface four corner luminance calculation unit 19 will be described in detail.

FIG. 9 is a block diagram indicating the configuration of projection surface four corner luminance calculation unit 19. In FIG. 9, a unidirectional arrow is a brief indication of the direction of flow of a signal (e.g., data, information, etc.) and does not preclude bi-directionality.

As shown in FIG. 9, projection surface four corner luminance calculation unit 19 includes projection surface four corner coordinate calculation unit 50, projection light amount calculation unit 51, projection surface four corner incidence luminance calculation unit 52, lens shift luminance coefficient storage unit 53, projection four corner screen gain calculation unit 54, and projection surface four corner exit luminance calculation unit 55.

Projection surface four corner coordinate calculation unit 50, based on the information of the zoom position and lens shift position obtained from projection lens unit 16 and the distance to the screen obtained from ranging unit 17, calculates the three-dimensional coordinates of the four corners of the projection surface with respect to projector 1. In the calculation of the three-dimensional coordinates of the four corners, projection surface four corner coordinate calculation unit 50 first obtains the three-dimensional coordinates of a distance measurement point, which is a certain point on the screen measured by the distance sensor of ranging unit 17, based on the distance to the screen that is measured and the direction of each of projector 1 and the distance sensor that is known. Then, projection surface four corner coordinate calculation unit 50, from the positional relationship between the distance and the projection surface of the lens optical axis direction of the distance measurement point is known, calculates the three-dimensional coordinates of the four corners of the projection surface.

Projection light amount calculation unit 51 calculates the amount of the projected light at the output of projection lens unit 16 based on the amount of light of the light source measured by light source light quantity sensor unit 14 and the optical gain from the output of light source unit 13 to the output of projection lens unit 16 which is known in the design of projector 1.

Projection surface four corner incidence luminance calculation unit 52 calculates the incident luminance at the four corners of the projection surface based on the three-dimensional coordinate of the four corners of the projection surface calculated by projection surface four corner coordinate calculation unit 50 and the projected light amount calculated by projection light amount calculation unit 51.

Normally, the projector is designed so that the luminance of the projection surface when projected near the lens central axis becomes uniform. Therefore, as shown in FIG. 8, based on the distance to the screen in the lens center axis direction and the zoom position, it is possible to calculate the luminance of the projection surface. Incidentally, since projector 1 is installed to face the screen, the incident luminance of the four corners, that is determined based on the distance to the screen in the lens center axis direction and the zoom position, is the same.

On the other hand, when the lens shift operation is performed, the projection surface largely deviates from the lens center axis, and as a result, the luminance of the projection surface is attenuated. Taking into account the attenuation due to the lens shift, the coefficient of luminance attenuation with respect to the horizontal/vertical position from the lens center axis is stored in lens shift luminance coefficient storage unit 53. When the lens shift operation is performed, projection surface four corner incident luminance calculation unit 52 uses the luminance attenuation coefficient stored in lens shift luminance coefficient storage unit 53 to calculate the incident luminance of the four corners of the projection surface.

Specifically, projection surface four corner incident luminance calculation unit 52, first, using the three-dimensional position of the four corners, obtains the incident luminance of the four corners from the distance to the screen in the lens center axis direction and the zoom position. Next, projection surface four corner incident luminance calculation unit 52, based on the lens shift position, calculates the horizontal/vertical position from the lens center axis, and obtains, from lens shift luminance coefficient storage unit 53, the coefficient of luminance attenuation that corresponds to the calculated horizontal/vertical position. Then, projection surface four corner incident luminance calculation unit 52, by multiplying the coefficient of luminance attenuation to the calculated incident luminance of the four corners, calculates the final incident luminance of the four corners.

Projection four corner screen gain calculation unit 54, based on the three-dimensional coordinates of the four corners of the projection surface calculated by projection surface four corner coordinate calculation unit 50, obtains the angle of incidence on the four corners of the projection surface. Then, projection four corner screen gain calculation unit 54 acquires characteristic data of the screen specified by the user from screen characteristic data storage unit 18, and acquires, based on the obtained characteristic data, the gain of exit light in the normal direction of the screen for incident light of the incident angle calculated for each of the four corners of the projection surface.

FIG. 10 schematically shows the projection state when the lens shift operation is performed in the state in which the projector 1 is installed to face the screen. In this example, the lens shift operation for shifting projection surface 41 in the upper left direction is performed. Ranging measurement point 42 is located in the vicinity of the lower right corner of projection surface 41. Projection surface four corner coordinate calculation unit 50 calculates the three-dimensional coordinates of the four corners of projection surface 41, and projection four corner screen gain calculation unit 54 obtains, based on the calculated three-dimensional coordinates of the four corners, the angle of incidence on the four corners of projection surface 41. Then, projection four corner screen gain calculation unit 54 acquires the gain of exit light in the normal direction of screen 40 for the incident light of each of the four corners based on the characteristic data of the screen specified by the user. For example, for the upper left corner of projection surface 41, projection four corner screen gain calculation unit 54 acquires the gain of exit light 48 with respect to incident light 47.

Projection surface four corner exit luminance calculation unit 55 multiples the incident luminance to the four corners of the projection surface calculated by the projection surface four corner incidence luminance calculation unit 52 and the screen gain of the four corners of the projection surface calculated by projection four corner screen gain calculation unit 54 to calculate the exit luminance of the four corners of the projection surface, respectively.

The above is an explanation of the specific configuration of projection surface four corner luminance calculation unit 19.

Control unit 20 determines, as the projection surface maximum luminance, the smallest value from among the luminance of the four corners of the projection surface calculated by projection surface four corner luminance calculation unit 19. Control unit 20 performs, based on the projection surface maximum luminance and metadata included in information with respect to the HDR display from input I/F unit 7, the calculation process of the coefficient of the tone map, the luminance adjusting process of the light source of light source unit 13 and the rewriting process of information of EOTF. By performing these processes, the HDR display is performed with absolute luminance. Furthermore, when the projection surface maximum luminance is too low, it is possible to switch from the HDR display to the SDR display, and when the projection surface maximum luminance is too high, it is possible to reduce the amount of light of light source. Further, control unit 20 generates a coefficient of luminance correction of the projection surface from the luminance of the four corners of the projection surface, and sets the coefficient to projection surface luminance correction unit 11.

FIG. 11 shows a procedure of a tone map creation process which is an example of a video display process executed by control unit 20. FIG. 12 shows a tone map created in the tone map creation process. In FIG. 12, the vertical axis indicates the output luminance, the horizontal axis indicates the input luminance.

Hereinafter, the tone map creation process will be described in detail with reference to FIGS. 11 and 12.

Control unit 20 determines whether or not the maximum luminance of the projection plane is equal to or greater than a MaxCLL value included in the meta data (step S10). Here, the MaxCLL is one of the first thresholds.

If the determination result of step S10 is "Yes", control unit 20 determines whether or not the projection surface maximum luminance is greater than the MaxCLL (step S11).

If the determination result of step S11 is "Yes", control unit 20 decreases the amount of light of the light source of light source unit 13 (step S12). For example, control unit 20 reduces the amount of light of the light source of light source unit 13 so that the amount of light of the light source is set to the amount of light to which the value obtained by dividing the value of MaxCLL by the projection surface maximum luminance is multiplied. For example, if the value obtained by dividing the value of MaxCLL by the projection surface maximum luminance is 0.8, the amount of light of the light source will be reduced by 0.8 times, i.e., 20%.

Next, control unit 20 sets a tone map having linear characteristics (for example, tone map 49a shown in FIG. 12) in tone map unit 10 (step S13). Here, the setting of the tone map having the linear characteristic is referred to as a setting without tone mapping.

If the determination result of the step S11 is "No", control unit 20 performs the process of step S13 without performing the process of step S12.

If the determination result of step S10 is "No", control unit 20 determines whether or not the projection surface maximum luminance is equal to or more than twice the value of MaxFALL included in the metadata (step S14). Here, the value that is twice as large as the value of MaxFALL is an example of the second threshold value.

If the determination result of step S14 is "Yes", control unit 20 performs tone mapping so that the maximum value of the output luminance becomes the projection surface maximum luminance (step S15). In the tone mapping, control unit 20 sets tone map 49b shown in FIG. 12, for example. Tone map 49b is a tone map in which a gamma coefficient is set so that the maximum value of the output luminance is set to the projection surface maximum luminance. The gradation characteristics of tone map 49b are set so that the amount of change in the output luminance is smaller than the amount of change in the input luminance in a predetermined gradation range of the higher side of the luminance.

When the determination result of step S14 is "No", control unit 20 performs tone mapping so that the maximum value of the output luminance becomes twice the maximum value of MaxFALL, or performs setting without tone mapping (step S16).

In the tone mapping performed in step S16, control unit 20 sets, for example, tone map 49c shown in FIG. 12. Tone map 49c is a tone map in which a gamma coefficient is set so that the maximum value of the output luminance is set to be twice the value of MaxFALL. Gradation characteristics of tone map 49c are set so that the amount of change in the output luminance is smaller than the amount of change in the input luminance in a predetermined gradation range of the higher side of the luminance.

Further, in the setting without tone mapping performed in step S16, control unit 20 sets the gamma for SDRs in the corresponding EOTF information of EDID. Then, control unit 20 changes the HPD signal from a high level to a low level, further changing from a low level to a high level. Thus, source device 2 can output an SDR signal in which EOTF is a gamma coefficient for SDR. As a result, it is possible to switch from the HDR display to the SDR display.

According to projector 1 of the present example embodiment described above, since the tone map can be set in accordance with the projection surface maximum luminance, even if the projection distance or the amount of light of the light source changes due to the change in the projection situation, the HDR display can be performed with absolute luminance.

Further, when the maximum luminance of the projection surface is larger than the maximum luminance of the image data, by reducing the amount of light of the light source, it is possible to improve the light utilization efficiency and extend the life of the light source.

Furthermore, if the maximum luminance of the projection surface is too small for the HDR display, the projection can be performed by switching from the HDR display to the SDR display.

Furthermore, since the non-uniformity of the luminance of the projection surface caused by performing the lens shift can be corrected, it is possible to correctly perform the HDR display with absolute luminance.

(Stack Display)

When a stack display, in which projected images of a plurality of projectors are overlapped and projected, is performed, it is difficult for each projector to perform the stack display with correct gradation only by performing the tone map creation process as shown in FIG. 11.

As examples, tone maps used in the respective projectors when displaying stacks using two projector PJ1, PJ2 will be described. Each of projector PJ1, PJ2 has the same configuration as projector 1. MaxCLL of the content is 4000 nits. The projection surface maximum luminance of projector PJ1 is 3000 nits, and the projection surface maximum luminance of projector PJ2 is 2000 nits.

FIG. 13A shows a tone map for projector PJ1 alone. FIG. 13B shows a tone map for projector PJ2 alone. FIG. 13C shows the tone map when the tone maps shown in FIGS. 13A and 13B are stacked. FIG. 13D shows a tone map for the total projector plane luminance of projectors PJ1 and PJ2. FIG. 13E shows a tone map for projector PJ1 that is created based on the tone map shown in FIG. 13D. FIG. 13F shows a tone map for projector PJ2 that is created based on the tone map shown in FIG. 13D.

Projector PJ1 has tone map 21a shown in FIG. 13A, and projector PJ2 has tone map 22a shown in FIG. 13B. Tone map 21a is set so that the maximum value of the output luminance is 3,000 nits, and has a linear characteristic in which the input luminance and the output luminance are the same in the range of 3,000 nits or less. On the other hand, tone map 22a is set so that the maximum value of the output luminance is 2000 nits, and has a linear characteristic in which the input luminance and the output luminance are the same in the range of 2000 nits or less.

When projector PJ1 with tone map 21a and projector PJ2 with tone map 22a perform the stack display, simply stacking tone map 21a and tone map 22a results in tone map 23a as shown in FIG. 13C. Tone map 23a has linear characteristics in both the range of 2,000 nits or less and the range of 2,000 nits or more and 2,000 nits or less, but their slopes are different from each other.

The total projection surface maximum luminance is 5000 nits when Projector PJ1 and the projector PJ2 perform the stack display. In this instance, it is desirable to use tone map 24a as shown in FIG. 13D, rather than tone map 23a shown in FIG. 13C, because the total projection surface maximum luminance exceeds 4,000 nits which is MaxCLL. Tone map 24a is set so that the maximum value of the output luminance is 4000 nits and has a linear characteristic in which the input luminance and the output luminance are the same in the entire range.

Therefore, in the present example embodiment, tone map 24a shown in FIG. 13D is created from the total projection surface maximum luminance, and a tone map of each of projectors PJ1 and PJ2 is created based on tone map 24a. Specifically, tone maps 25a and 26a as shown in FIGS. 13E and 13F are created by dividing tone maps 24a into two based on the ratio of the projection surface maximum luminance of each of projectors PJ1 and PJ2 to the total projection surface maximum luminance. The maximum value of the output luminance of tone map 25a is set to 2,400 nits (=4,000×3,000÷5,000). Tone map 25a has a linear characteristic in the entire range. The maximum value of the output luminance of tone map 26a is set to 1600 nits (=4000×2000÷5000). Tone map 26a has a linear characteristic in the entire range.

2400 nits, which is the maximum value of the output luminance of tone map 25a for projector PJ1, is smaller than 3000 nits, which is the projection surface maximum luminance of projector PJ1. Therefore, the amount of light of the light source of projector PJ1 is reduced to "the maximum value of the output luminance/the projection surface maximum luminance (=2400/3000)".

Similarly, 1600 nits, which is the maximum value of the output luminance of tone map 26a for projector PJ2, is smaller than 2000 nits, which is the projection surface maximum luminance of projector PJ2. Therefore, the amount of light of the light source of projector PJ2 is reduced to "the maximum value of the output luminance/the projection surface maximum luminance (=1600/2000)".

As another example, a tone map will be described where MaxCLL of the contents is 4000 nits and the projection surface maximum luminance values of projectors PJ1 and PJ2 are 2000 nits and 1500 nits, respectively.

FIG. 14A shows a tone map, which is another example, for projector PJ1 alone. FIG. 14B shows a tone map, which is another example, for projector PJ2 alone. Tone map 21a shown in FIG. 14A is set so that the maximum value of the output luminance is 2000 nits, and has a linear characteristic in which the input luminance and the output luminance are the same in the range of 2000 nits or less. On the other hand, tone map 22b shown in FIG. 14B is set so that the maximum value of the output luminance is 1,500 nits, and has a linear characteristic in which the input luminance and the output luminance are the same in the range of 1,500 nits or less.

When the tone maps shown in FIGS. 14A and 14B are simply stacked, tone map 23b as shown in FIG. 14C is obtained. Tone map 23b is set so that the maximum value of the output luminance is 3,500 nits, and has linear characteristics in both the range of 1,500 nits or less and the range of 1,500 nits or more and 2,000 nits or less, but their slopes are different from each other.

Rather than using the tone map 23b shown in FIG. 14C, it is desirable to use tone map 24b as shown in FIG. 14D. Tone map 24b is set so that the maximum value of the output luminance is 3,500 nits, and has a linear characteristic in which the input luminance and the output luminance are the same in the range of 3,500 nits or less.

In the above cases, tone map 24b shown in FIG. 14D is created, and the tone map of each projectors PJ1 and PJ2 is created based on tone map 24b. Specifically, tone maps 25b and 26b as shown in FIGS. 14E and 14F are created by dividing tone maps 24b into two based on the ratio of the projection surface maximum luminance of each of projectors PJ1 and PJ2 to the total projection surface maximum luminance Tone map 25b is set so that the maximum value of the output luminance is 2000 nits (=3500×2000÷3500), and has a linear characteristic in the range of 2,000 nits or less. Tone map 26a is set so that the maximum value of the output luminance is 1500 nits (=3500×1500÷3500), and has a linear characteristic in the range of 1,500 nits or less.

The maximum value of the output luminance of tone map 25b for projector PJ1, 2000 nits, matches the projection surface maximum luminance of projector PJ1, 2000 nits. In this situation, there is no need to adjust the amount of light of the light source of projector PJ1.

Similarly, the maximum value of the output luminance of tone map 26a for projector PJ2, 1500 nits, matches the projection surface maximum luminance of projector PJ2, 1500 nits. Again, there is no need to adjust the amount of light of the light source of projector PJ2.

The above is a rough sequence related to the creation of a tone map when the stack display is performed using two projector PJ1, PJ2.

In the present example embodiment, the stack display system is configured using n projectors 1, and any one projector operates as a main projector and the other projector operates as a sub projector. Here, n indicating the number of projectors 1 is an arbitrary value.

In the following, the operations related to tone map creation in each of the main projector and the sub projector will be described in detail. Incidentally, the main projector and the sub projector each have the configuration shown in FIG. 5.

First, control unit 20 of the main projector makes projection surface four corner luminance calculation unit 19 of the own projector and projection surface four corner luminance calculation unit 19 of each sub projector calculate the luminance of the four corners of the projection surface, respectively.

In each sub projector, control unit 20 sets, as the projection surface maximum luminance, the smallest value from among the luminance of the four corners of the projection surface calculated by projection surface four corner luminance calculation unit 19. Then, control unit 20 transmits the projection surface maximum luminance to the main projector via communication control unit 6.

In the main projector, control unit 20 sets, as the projection surface maximum luminance, the smallest value from among the luminance of the four corners of the projection surface calculated by projection surface four corner luminance calculation unit 19 of the own projector. Further, control unit 20 receives the projection surface maximum luminance via communication control unit 6 from each sub projector. Further, control unit 20 sums the projection surface maximum luminance of the own projector and the projection surface maximum luminance of each sub projector. Further, control unit 20 creates a tone map (for example, the tone map of FIG. 13D or FIG. 14D) based on the total projection surface maximum luminance according to the above-described procedure (for example, the procedure of FIGS. 13A to 13F and 14A to 14F). Then, control unit 20 creates a tone map of each projector by dividing the tone map according to the total projection surface maximum luminance into n based on the ratio of the projection surface maximum luminance of each of the n projectors to the total projection surface maximum luminance.

Here, as an example, a brief description will be given of the total projection surface maximum luminance when the stack display is performed using two projectors PJ1 and PJ2.

FIG. 15A schematically shows the luminance of the four corners of the projection surface of projector PJ1 and the maximum luminance of the projection surface. In FIG. 15A, the luminance of the four corners of the projection surface is indicated by black circles, the projection surface maximum luminance is indicated by a broken line. Black circle 27a indicates the luminance of the lower left corner of the projection surface, black circle 27b indicates the luminance of the upper left corner of the projection surface, black circle 27c indicates the luminance of the upper right corner of the projection surface, and black circle 27d indicates the luminance of the lower right corner of the projection surface. From among black circles 27a to 27d, the luminance of black circle 27d is the smallest. Therefore, projection surface maximum luminance 27e shown by the broken line is set to the luminance of black circle 27d.

FIG. 15B schematically shows the luminance of the four corners of the projection surface of projector PJ2 and the maximum luminance of the projection surface. In FIG. 15B, the luminance of the four corners of the projection surface is indicated by black circles, the projection surface maximum luminance is indicated by a broken line. Black circle 28a indicates the luminance of the lower left corner of the projection surface, black circle 28b indicates the luminance of the upper left corner of the projection surface, black circle 28c indicates the luminance of the upper right corner of the projection surface, and black circle 28d indicates the luminance of the lower right corner of the projection surface. From among black circles 28a to 28d, the luminance of black circle 28b is the smallest. Therefore, projection surface maximum luminance 28e shown by the broken line is set to the luminance of black circle 28b.

FIG. 15C shows schematically the total projection surface maximum luminance when the stack display is performed. In FIG. 15C, the projection surface maximum luminance is indicated by a dashed line. Total projection surface maximum luminance 29e shown in FIG. 15C is obtained by stacking the projection surface maximum luminance of projector PJ2 shown in FIG. 15B to the projection surface maximum luminance of projector PJ1 shown in FIG. 15A. The tone maps shown in FIGS. 13D and 14D are created based on total projection surface maximum luminance 29e as shown in FIG. 15C.

In the main projector, after the tone map of each projector is created by dividing the tone map according to the total projection surface maximum luminance into n, control unit 20 transmits the tone map of the sub projector to each sub projector via communication control unit 6. Further, control unit 20 sets the tone map of the own projector to tone map 10. At this time, when the maximum luminance indicated by the tone map is greater than the projection surface maximum luminance, control unit 20 reduces the amount of light of the light source to "the maximum luminance/the projection surface maximum luminance".

On the other hand, in each sub projector, control unit 20 sets the tone map received from the main projector to tone map 10. At this time, when the maximum luminance indicated by the tone map is greater than the projection surface maximum luminance, control unit 20 reduces the amount of light of the light source to "the maximum luminance/the projection surface maximum luminance".

In the main projector, control unit 20 determines whether or not the total projection surface maximum luminance is smaller than twice the value of MaxFALL. When the total projection surface maximum luminance is smaller than the value twice MaxFALL, control unit 20 performs tone mapping so that the maximum value of the output luminance is the value that is twice MaxFALL and divides the tone map into n to create a tone map of the respective projectors. Thereafter, control unit 20 transmits the tone map of the sub projector to each sub projector via communication control unit 6. Alternatively, according to the setting instruction without tone mapping, in each of the main projector and the sub projector, control unit 20 sets the tone map having the linear characteristic, and sets the gamma for SDR to the corresponding EOTF information of EDID. Then, control unit 20 changes the HPD signal from a high level to a low level, further changing from a low level to a high level. Thus, source device 2 can output an SDR signal in which EOTF is a gamma coefficient for SDR. As a result, it is possible to switch from the HDR display to the SDR display.

Further, in each of the main projector and the sub projector, control unit 20 generates a coefficient of luminance correction of the projection surface from the luminance of the four corners of the projection surface. Then, control unit 20 sets the generated coefficient to projection surface luminance correction unit 11.

According to the stack display system including the main projector and the sub projector described above, it is possible to perform the stack display with correct gradation.

Third Example Embodiment

FIG. 16 is a block diagram showing a configuration of a projector according to a third example embodiment of the present invention. In FIG. 16, a unidirectional arrow is a brief indication of the direction of flow of a signal (e.g., data, information, etc.) and does not preclude bi-directionality.

Projector 1a shown in FIG. 16 differs from projector 1 of the second example embodiment in that it includes distortion correction data storage unit 21 and distortion correction unit 22, and further includes projection surface four corner luminance calculation unit 19a instead of projection surface four corner luminance calculation unit 19. The same components as those of projector 1 are denoted by the same reference numerals, and their descriptions are omitted here.

In the present example embodiment, it is assumed that projector 1a is used without facing the screen, and that the positional relation between projector 1a and the screen is fixed.

Distortion correction data storage unit 21 stores correction data for correcting the distortion of the projected image that occurs when the image is projected on the screen that is not facing the projector. Distortion correction data storage unit 21 performs distortion correction on the output video data of tone map 10 using the correction data stored in distortion correction data storage unit 21.

FIG. 17 schematically shows the relationship between the projected image area when projecting an image on a screen 40 that is not facing projector 1a and the projected image area after distortion correction. In this example, the distances from the projection lens to the lower left corner and the lower right corner of the four corners of projection surface 41 are longer than those in the state in which the projector faces the screen. However, the distance from the projection lens to the lower left corner coincides with the distance from the projection lens to the lower right corner.

In FIG. 17, the frame shown by a broken line is normal projection image area 41*a* before the distortion correction, the frame shown by a solid line is projection image area 41*b* after the distortion correction. The shape of projection image area 41*a* is rectangular. On the other hand, the shape of projection image area 41*b* has a trapezoidal shape. The upper end of projection image area 41*a* coincides with the upper end of projection image area 41*b*. The lower end of the projection image area 41*b* is smaller than the lower end of the projection image area 41*a*. The vertical size of projection image area 41*b* is smaller than the vertical size of projection image area 41*a*.

By correcting image data so that projection image area 41*a* is projection image area 41*b*, the shape of projection surface 41 on screen 40 can be square (square or rectangular). In this case, distortion correction data for transforming projection image area 41*a* into projection image area 41*b* is stored in distortion correction data storage unit 21. Based on the distortion correction data, it is possible to obtain the horizontal/vertical inclination of screen 40 shown in FIG. 17.

FIG. 18 schematically illustrates, as another example, the relation between the projected image area when projecting an image on screen 40 that is not facing projector 1*a* and the projected image area after distortion correction. In this example, from among the four corners of the projection surface 41, the distance from the projection lens to the upper right corner, the distance from the projection lens to the lower left corner, and the distance from the projection lens to the lower right corner are longer than those in the state in which the projector faces the screen.

In FIG. 18, the frame shown by a broken line is normal projection image area 41*a* before the distortion correction, and the frame shown by a solid line is projection image area 41*c* after the distortion correction. The shape of projection image area 41*a* is rectangular. On the other hand, projection image area 41*c* has a rectangular shape, but the length of each side is different. The upper left corner of the projection image area 41*a* coincides with the upper left corner of projection image area 41*c*. The size of both the vertical direction and the lateral direction of projection image area 41*c* is smaller than the size of both the vertical direction and the lateral direction of projection image area 41*a*.

By correcting the image data so that projection image area 41*a* is projection image area 41*c*, the shape of projection surface 41 on screen 40 can be square (tetragon or rectangular). In this case, distortion correction data for transforming projection image area 41*a* into projection image area 41*b* is stored in distortion correction data storage unit 21. Based on the distortion correction data, it is possible to obtain the horizontal/vertical inclination of screen 40 shown in FIG. 18.

In the present example embodiment, distortion correction data storage unit 21 transforms the projection image area to the projection image area after correction (such as projection image area 41*b* of FIG. 17 or projection image area 41*c* of FIG. 18) by performing distortion correction for the output video data of tone map 10. Therefore, projection surface four corner luminance calculation unit 19*a* acquires the distortion degree based on the distortion correction data stored in distortion correction data storage unit 21 and calculates the three-dimensional position of the four corners of the projection surface when the deformed projection image is projected on the screen.

FIG. 19 is a block diagram showing the configuration of projection surface four corner luminance calculation unit 19*a*. In FIG. 19, a unidirectional arrow is a brief indication of the direction of flow of a signal (e.g., data, information, etc.) and does not preclude bi-directionality.

As shown in FIG. 19, projection surface four corner luminance calculation unit 19*a* includes projection surface four corner coordinate calculation unit 56, projection light amount calculation unit 51, projection surface four corner incident luminance calculation unit 52, lens shift luminance coefficient storage unit 53, projection four corner screen gain calculation unit 54, and projection surface four corner exit luminance calculation unit 55. Configurations other than projection plane four corner coordinate calculation unit 56 are the same as those shown in FIG. 9.

Projection surface four corner coordinate calculation unit 56 calculates the three-dimensional coordinates of the four corners of the projection surface with respect to projector 1 based on information of the zoom position and lens shift position obtained from projection lens unit 16, the distance from ranging unit 17 to the screen, and the distortion correction data stored in distortion correction data storage unit 21.

In the calculation of the three-dimensional coordinates of the four corners, projection surface four corner coordinate calculation unit 56 first obtains the three-dimensional coordinate of a distance measuring point, which is a certain point on the screen 40 to be measured by the distance sensor of ranging unit 17, based on the measured distance to the screen and the direction of each of projector 1*a* and the distance sensor that are known. Next, projection surface four corner coordinate calculation unit 56 calculates the inclination of the horizontal/vertical direction of screen 40 based on the distortion correction data. Then, projection surface four corner coordinate calculation unit 56 calculates the three-dimensional coordinates of the four corners of the projection surface with respect to projector 1 based on the distance of the distance measuring point in the lens optical axis direction which is known, the positional relationship of the projection surface, and the inclination of the screen.

Incidentally, since screen 40 does not face projector 1*a*, the incident luminance of the four corners, which is determined based on the distance from the projection lens to screen 40 in the lens center axis direction and the zoom position, is not the same.

According to Projector 1*a* of the present example embodiment described above, it is possible to perform the HDR display at the absolute luminance value even when the projector is not directly opposite to screen 40.

Further, as in the second example embodiment, since the tone map can be set in accordance with the projection surface maximum luminance, it is possible to perform the display with absolute luminance even if the projection distance and the amount of light of the light source change due to the change of the projection situation.

Furthermore, when the maximum luminance of the projection surface is larger than the maximum luminance of the image data, by reducing the amount of light of the light source, it is possible to improve the light utilization efficiency and to extend the life of the light source.

Furthermore, if the maximum luminance on the projection surface is too small for the HDR display, it is possible to project by switching from the HDR display to the SDR display.

Moreover, since the non-uniformity of the luminance in the projection plane that is caused due to the lens shift can be corrected, it is possible to correctly perform the HDR display with absolute luminance.

Further, it is possible to cope with the stack display described in the second example embodiment.

Fourth Example Embodiment

FIG. 20 is a block diagram showing a configuration of a projector according to a fourth example embodiment of the present invention. In FIG. 20, a unidirectional arrow provides a brief indication of the direction of flow of a signal (e.g., data, information, etc.) and does not eliminate bi-directionality.

Projector 1b shown in FIG. 20 differs from projector 1a of the third example embodiment in that 3D tone map section 23 is provided in place of tone map section 10. The same components as those of the projector 1a are denoted by the same reference numerals, and their descriptions are omitted here.

Tone map unit 10 merely performs the gradation conversion of the output luminance with respect to the input luminance, and performs the same conversion for all pixels of the video data. In contrast, 3D tone map unit 23 performs gradation transformation of different properties according to the position of the pixels of the video data.

Control unit 20 creates a tone map of the four corners based on the luminance of the four corners of the projection surface calculated by projection surface four corner luminance calculation unit 19a. Specifically, the control unit 20 sets, for each luminance of the four corners, the luminance as the projection surface maximum luminance, and creates a tone map according to the procedure described in the second example embodiment (see the procedure in FIG. 11). Control unit 20 sets the tone maps of the four corners in 3D tone map unit 23.

3D tone map unit 23 calculates the tone map for each pixel from the tone maps of the four corners using the complement, and performs tone mapping (luminance gradation conversion) in each tone map for each pixel of the image from image processing unit 9.

The configurations of control unit 20 and 3D tone map unit 23 as described above can also be applied to projector 1 of the second example embodiment.

(Stack Display)

A stack display system can be configured by using n projectors 1b. In this stack display system, any one projector 1b operates as a main projector and the other projector 1b operates as a sub projector. Here, n indicating the number of projectors 1 is an arbitrary value.

In the following, the operations related to tone maps of the four corners in each of the main projector and the sub projector will be described in detail. The main projector and the sub projector each have the configuration shown in FIG. 20.

First, control unit 20 of the main projector calculates the luminance of the four corners of the projection surface by projection surface four corner luminance calculation unit 19a of the own projector and projection surface four corner luminance calculation unit 19a of each sub projector, respectively.

In each sub projector, control unit 20 transmits information of the luminance of the four corners of the projection surface, which is calculated by projection surface four corner luminance calculation unit 19a, to the main projector via communication control unit 6.

In the main projector, control unit 20 acquires the luminance of the four corners of the projection surface calculated by the own projector and the luminance of the four corners of the projection surface calculated by each sub projector, and calculates the total projection surface four corner luminance Here, the total projection surface four corner luminance includes a value obtained by summing the luminance calculated by each projector for each corner of the upper left corner, the upper right corner, the lower left corner, and the lower right corner, respectively. Control unit 20 sets the smallest value of the total projection surface four corner luminance to the total projection surface maximum luminance.

Here, the total projection surface maximum luminance will be specifically described. As an example, a brief description will be given of the total projected surface maximal luminance when the stack display is performed using two projectors PJ1 and PJ2.

FIG. 21A schematically shows the luminance of the four corners of the projection surface of projector PJ1 and the maximum luminance of the projection surface. In FIG. 21A, the luminance of the four corners of the projection surface is indicated by a black circle, the projection surface maximum luminance is indicated by a broken line. Black circle 27a indicates the luminance of the projection surface lower left corner, black circle 27b indicates the luminance of the projection surface upper left corner, black circle 27c indicates the luminance of the projection surface upper right corner, and black circle 27d indicates the luminance of the projection surface lower right corner. From among black circles 27a to 27d, the luminance of black circle 27d is the smallest. Therefore, projection surface maximum luminance 27e shown by the broken line is set to the luminance of black circle 27d.

FIG. 21B schematically shows the luminance of the four corners of the projection surface of the projector PJ2 and the maximum luminance of the projection surface. In FIG. 21B, the luminance of the four corners of the projection surface is indicated by a black circle, the projection surface maximum luminance is indicated by a broken line. Black circle 28a indicates the luminance of the projection surface lower left corner, black circle 28b indicates the luminance of the projection surface upper left corner, black circle 28c indicates the luminance of the projection surface upper right corner, and black circle 28d indicates the luminance of the projection surface lower right corner. From among black circles 28a to 28d, the luminance of black circle 28b is the smallest. Therefore, projection surface maximum luminance 28e shown by the broken line is set to the luminance of black circle 28b.

FIG. 21C shows schematically the maximum luminance of the total projection surface when the stack display is performed. In FIG. 21C, the luminance of the four corners of the projection surface is indicated by a black circle, the total projection surface maximum luminance is indicated by a broken line. Black circle 29a indicates the luminance of the projection surface lower left corner, black circle 29b indicates the luminance of the projection surface upper left corner, black circle 29c indicates the luminance of the projection surface upper right corner, and black circle 29d indicates the luminance of the projection surface lower right corner. The luminance of black circle 29a is a value obtained by adding the luminance of black circle 28a shown in FIG. 21B to the luminance of black circle 27a shown in FIG. 21A. The luminance of black circle 29b is a value obtained by adding the luminance of black circle 28b shown in FIG. 21B to the luminance of black circle 27b shown in FIG. 21A. The luminance of black circle 29c is a value obtained by adding the luminance of black circle 28c shown in FIG. 21B to the luminance of black circle 27c shown in FIG. 21A. The luminance of black circle 29d is a value obtained by adding the luminance of black circle 28d shown in FIG. 21B to the luminance of black circle 27d shown in FIG. 21A. From among black circles 29a to 29d, the luminance of black circle 29d is the smallest. Therefore, total projection surface maximum luminance 29f indicated by the broken line is set to the luminance of black circle 29d.

In FIG. 21c, the frame shown by a dotted line is the projection surface maximum luminance 29e shown in FIG. 15C. Total projection surface maximum luminance 29f is larger than projection surface maximum luminance 29e.

Control unit 20 of the main projector creates a tone map according to the total projection surface maximum luminance according to the procedure described in the second example embodiment (for example, a procedure for creating a tone map in FIG. 13D or FIG. 14D). Then, control unit 20 creates, from the tone map corresponding to the total projection surface maximum luminance, a tone map of the four corners of each of the main projector and the sub projector at the ratio of the total projection surface four corner luminance.

For example, in the example embodiment shown in FIGS. 21A-21C, the tone maps of the four corners of projector PJ1 (main projector) are created as follows.

(Tone Map of the Lower Left Corner)
The tone map of the lower left corner is created so that the maximum value of the output luminance is to be a value calculated by [total projection surface maximum luminance]×[luminance of black circles 27a]÷[luminance of black circles 27a+luminance of black circles 28a].

(Tone Map of the Upper Left Corner)
The tone map of the upper left corner is created so that the maximum value of the output luminance is to be a value calculated by [total projection surface maximum luminance]×[luminance of black circles 27b]÷[luminance of black circles 27b+luminance of black circles 28b].

(Tone Map of the Upper Right Corner)
The tone map of the upper right corner is created so that the maximum value of the output luminance is to be a value calculated by [total projection surface maximum luminance]×[luminance of black circles 27c]÷[luminance of black circles 27c+luminance of black circles 28c].

(Tone Map of the Lower Right Corner)
The tone map of the lower right corner of the projector PJ is created so that the maximum value of the output luminance is to be a value calculated by [the total projection surface maximum luminance]×[the luminance of the black circle 27d]÷[the luminance of the black circle 27d+the luminance of the black circle 28d].

Further, in the example embodiment shown in FIGS. 21A-21C, the tone maps of the four corners of projector PJ2 (sub projector) are created as follows.

(Tone Map of the Lower Left Corner)
The tone map of the lower left corner is created so that the maximum value of the output luminance is to be a value calculated by [total projection surface maximum luminance]×[luminance of black circles 28a]÷[luminance of black circles 27a+luminance of black circles 28a].

(Tone Map of the Upper Left Corner)
The tone map of the upper left corner is created so that the maximum value of the output luminance is to be a value calculated by [total projection surface maximum luminance]×[luminance of black circles 28b]÷[luminance of black circles 27b+luminance of black circles 28b].

(Tone Map of the Upper Right Corner)
The tone map of the upper right corner is created so that the maximum value of the output luminance is to be a value calculated by [total projection surface maximum luminance]×[luminance of black circles 28c]÷[luminance of black circles 27c+luminance of black circles 28c].

(Tone Map of the Lower Right Corner)
The tone map of the lower right corner is created so that the maximum value of the output luminance is to be a value calculated by [total projection surface maximum luminance]×[luminance of black circles 28d]÷[luminance of black circles 27d+luminance of black circles 28d].

When the tone maps of the four corners of each of the main projector and the sub projector are created as described above, in the main projector, control unit 20 sets the tone maps of the four corners of its own projector to 3D tone map unit 23 and transmits the tone maps of the four corners to the respective sub projectors via communication control unit 6.

In the sub projector, control unit 20 sets the tone maps of the four corners of its own projector received from main projector to 3D tone map unit 23.

In the main projector and the sub projector, 3D tone map unit 23 calculates the tone map for each pixel from the tone maps of the four corners using the complement, and performs tone mapping (luminance gradation conversion) using each tone map for each pixel of the image from image processing unit 9.

In the main projector and the sub projector, control unit 20 determines whether or not all of the four maximum luminance values indicated by each of the tone maps of the four corners are larger than the projection surface maximum luminance of the own projector. If all of the four maximum luminance values are larger than the projection surface maximum luminance of the own projector, control unit 20 reduces the amount of light of the light source to be the amount of light to which the value, which is obtained by dividing the maximum value of the four maximum luminance values by the projection surface maximum luminance, is multiplied.

According to the stack display system described above, by using 3D tone map unit 23, it is possible to maximize the luminance of the projection surface when the stack display is performed.

In the first to fourth example embodiments described above, the operation or function of the projector (for example, the functions of signal processing unit 3, HDR display control unit 5, and communication control unit 6) may be realized by the computer executing a program. Here, the program may be provided in a computer-usable or computer-readable medium, or may be provided over a network such as the Internet. Here, a computer-usable or computer-readable medium is a medium that can record or read out information using magnetic, optical, electronic, electromagnetic, infrared, or the like. Such a medium includes, for example, a semiconductor memory, a semiconductor or solid state storage device, a magnetic tape, a removable computer diskette, a random access memory (RAM), a read only memory (ROM), a magnetic disk, an optical disk, a magneto-optical disk, and the like.

The configuration described in the first to fourth example embodiments described above is an example of the present invention, and changes or improvements that can be understood by a person skilled in the art can be applied to the configuration without departing from the spirit of the present invention.

All or a part of the first to fourth example embodiments described above may also be described as in the following supplementary notes 1-21, but are not limited to these supplementary notes 1-21.

[Supplementary Note 1]

A projector comprising:

a light source;

a spatial light modulator that modulates light from the light source to emit a modulated light;

a signal processing unit that comprises a tone map unit that performs a luminance gradation conversion of an input video data according to a tone map indicating a relationship of an output luminance with respect to an input luminance and that drives the spatial light modulator based on an output video data of the tone map unit;

a projection lens unit that projects the modulated light on a screen;

a luminance acquiring unit that obtains a maximum luminance of a projection surface of the modulated light; and a control unit that controls an amount of light of the light source and sets the tone map, wherein:

when the maximum luminance of the projection surface is equal to or greater than a first threshold value indicating a maximum luminance of the input video data, the control unit sets, to the tone map unit, a tone map in which a maximum value of the output luminance is set to be the first threshold value, and when the maximum luminance of the projection surface is larger than the first threshold value, the control unit reduces the amount of light of the light source.

[Supplementary Note 2]

The projector according to Supplementary note 1, wherein the control unit sets a tone map in which a gamma coefficient is set so that the maximum value of the output luminance is to be the maximum luminance of the projection surface when the maximum luminance of the projection surface is less than the first threshold value and is equal to or greater than a second threshold value that is smaller than the first threshold value, and sets a gradation characteristic such that an amount of changes in the output luminance is smaller than an amount of changes in input luminance in a predetermined gradation range on a high luminance side of the tone map.

[Supplementary Note 3]

The projector according to Supplementary note 2, wherein the control unit sets a tone map in which the gamma coefficient is set so that the maximum value of the output luminance is to be the second threshold value when the maximum luminance of the projection surface is less than the second threshold value, and sets the gradation characteristic such that the amount of changes in the output luminance is smaller than the amount of changes in the input luminance in the predetermined gradation range on the high luminance side of the tone map.

[Supplementary Note 4]

The projector according to Supplementary note 2, wherein the control unit sets a tone map having a linear gradation characteristic in which the maximum value of the output luminance is set to be the second threshold value when the maximum luminance of the projection surface is less than the second threshold value.

[Supplementary Note 5]

The projector according to Supplementary note 3 or 4, wherein the signal processing unit comprises:

an information storage unit that stores at least EOTF (Electro-Optical Transfer Function) information;

an interface unit that is capable of mutually communicating with a source device, supplies the EOTF information stored in the information storage unit to the source device and receives a video signal from the source device;

a video processing unit that receives the video signal from the source device via the interface unit, performs an EOTF process on the video data included in the video signal in accordance with the EOTF information stored in the information storage unit, and supplies, as the input video data, the video data after the EOTF process is performed to the tone map unit.

wherein the control unit stores the EOTF information related to an HDR (High Dynamic Range) display in the information storage unit when the maximum luminance of the projection surface is equal to or greater than the second threshold, and stores the EOTF information related to a SDR (Standard Dynamic Range) display in the information storage unit when the maximum luminance of the projection surface is less than the second threshold.

[Supplementary Note 6]

The projector according to any one of Supplementary notes 3 to 5, wherein the second threshold is twice the maximum value of the intra-frame average luminance of the input video data.

[Supplementary Note 7]

The projector according to any one of Supplementary notes 1 to 6, further comprising:

a light sensor that measures the amount of light of the light source;

a ranging unit that measures the distance from the projection lens unit to the screen; and a screen characteristic storage unit that stores characteristic data indicating a gain distribution of exit light with respect to incident light for each of a plurality of screens, wherein the luminance acquiring unit acquires characteristic data of the screen specified by a user from the screen characteristic storage unit, and calculates the maximum luminance of the projection surface based on the obtained characteristic data, the amount of light of the light source measured by the light sensor, and the distance measured by the ranging unit.

[Supplementary Note 8]

The projector according to Supplementary note 7, wherein the projection lens unit comprises a zoom lens unit that is configured to move at least a port of lenses in the optical axis direction, wherein the luminance acquiring unit calculates the maximum luminance of the projection surface based on the characteristic data of the screen specified by a user, the amount of light of the light source measured by the light sensor, the distance measured by the ranging unit, and the zoom position indicating a position of the at least a part of lenses in the optical axis direction.

[Supplementary Note 9]

The projector according to Supplementary note 8, wherein the projection lens unit further comprises a lens shift unit that moves a lens group in a direction perpendicular to the optical axis, wherein the luminance acquiring unit includes:

a lens shift luminance coefficient storage unit that stores a coefficient of luminance attenuation of the projection surface corresponding to the movement direction and the movement amount of the lens group;

a projection surface coordinate calculation unit that calculates the coordinates of the four corners of the projection surface based on the moving direction and the movement amount of the lens group, the zoom position, and the distance measured by the ranging unit;

a projection light amount calculation unit that calculates the amount of projected light obtained by multiplying the amount of light of the light source measured by the light sensor by a predetermined gain;

a projection surface incident luminance calculation unit that acquires the coefficient of luminance attenuation corresponding to the movement direction and the movement amount of the lens group from the lens shift luminance coefficient storage unit and that calculates incident luminance at the four corners of the projection surface based on the obtained coefficient, the coordinates of the four corners of the projection surface calculated by the projection surface coordinate calculation unit, and the amount of the projected light calculated by the projection light amount calculation unit;

a screen gain calculation unit that calculates the incident angle on the four corners of the projection surface based on the coordinates of the four corners of the projection surface calculated by the projection surface coordinate calculation unit and that calculates the gain of exit light from the four corners based on the incident angle of the four corners and the characteristic data of the screen specified by a user; and a projection surface exit luminance calculation unit that calculates the luminance of the four corners of the projection surface based on the incident luminance to the four corners of the projection surface calculated by the projection surface incident luminance calculation unit and the gain at the four corners of the projection surface calculated by the screen gain calculation unit, wherein the maximum luminance of the projection surface is the smallest value from among the luminance values of the four corners of the projection surface calculated by the projection surface exit luminance calculation uni.

[Supplementary Note 10]

The projector according to Supplementary note 9, wherein the signal processing unit further includes:

a distortion correction data storage unit that stores the distortion correction data for correcting the distortion of the projected image caused according to the angle formed between the screen and the lens center axis of the projection lens unit; and a distortion correcting unit that performs distortion correction based on the distortion correction data with respect to the output video data of the tone map unit, wherein the projection surface coordinate calculation unit calculates the coordinates of the four corners of the projection surface based on the movement direction and movement amount of the lens group, the zoom position, the distance measured by the ranging unit, and the distortion correction data.

[Supplementary Note 11]

The projector according to Supplementary note 9 or 10, wherein the signal processing unit further includes a projection surface luminance correction unit that adjusts the gain of each pixel of the output video data of the tone map unit according to the luminance correction coefficient for correcting the non-uniformity of the luminance of the projection surface, wherein the control unit generates the luminance correction coefficient based on the luminance values of the four corners of the projection surface calculated by the projection surface exit luminance calculation unit.

[Supplementary Note 12]

The projector according to any one of Supplementary notes 1 to 11, wherein the luminance acquiring unit calculates the luminance at a plurality of points on the projection surface of the modulated light according to the projection state, and sets the smallest value from among the luminance value of each point as the maximum luminance of the projection surface.

[Supplementary Note 13]

The projector according to any one of Supplementary notes 1 to 12, further comprising a communication unit that mutually communicates with at least one other projector, wherein the control unit acquires, via the communication unit, information relating to the maximum luminance of the projection surface obtained by the another projector, and creates a tone map of each of the own projector and the another projector based on information relating to the maximum luminance of the projection surface obtained by the own projector and the information relating to the maximum luminance of the projection surface obtained from the another projector.

[Supplementary Note 14]

The projector according to Supplementary note 13, wherein the control unit acquires the maximum luminance of the projection surface from the another projector, calculates a total maximum luminance obtained by summing the maximum luminance of the projection surface obtained by the own projector and the maximum luminance of the projection surface obtained from the another projector, and creates a tone map of each of the own projector and the another projector based on the total maximum luminance and the ratio of the maximum luminance of the projection surface to the total maximum luminance of each of the own projector and the another projector.

[Supplementary Note 15]

The projector according to Supplementary note 13, wherein the control unit acquires the luminance of the four corners of the projection surface from the another projector; calculates a total four corner maximum luminance obtained by summing, for each of the four corners, the luminance of the four corners of the projection surface acquired by the own projector and the luminance of the four corners of the projection surface acquired from the another projector; sets, as the projection surface maximum luminance, a smallest value of the maximum luminance of each corner of the total four corner maximum luminance; and creates a tone map of the four corners of each of the own projector and the another projector based on the projection surface maximum luminance and the ratio of the luminance of each corner of the projection surface to the maximum luminance of each corner of the total four corner maximum luminance of each of the own projector and the another projector.

[Supplementary Note 16]

The projector according to Supplementary note 15, wherein the tone map unit calculates a tone map for each pixel of the input video data based on the tone maps of four corners of the own projector, and performs a luminance gradation conversion using a corresponding tone map for each pixel.

[Supplementary Note 17]

A stack display system comprising a main projector and at least one sub projector, each comprising the projector according to any one of Supplementary notes 1 to 5, wherein the main projector and the sub projector project overlap and project images of each other on a screen, wherein a control unit of the main projector acquires information relating to a maximum luminance of a projection surface acquired by the sub projector and creates a tone map of each of its own projector and the sub projector based on information relating to the maximum luminance of the projection surface acquired by the own projector and information relating to the maximum luminance of the projection surface acquired from the sub projector.

[Supplementary Note 18]

The stack display system according to Supplementary note 17, wherein the control unit of the main projector acquires the maximum luminance of the projection surface from the sub projector, calculates a total maximum luminance by summing the maximum luminance of the projection surface obtained by the own projector and the maximum luminance of the projection surface obtained from the sub projector, and creates a tone map of each of the own projector and the sub projector based on the total maximum luminance and the ratio of the maximum luminance of the projection surface to the total maximum luminance of each of the own projector and the sub projector.

[Supplementary Note 19]

The stack display system according to Supplementary note 17, wherein the control unit of the main projector acquires the luminance of the four corners of the projection surface from the sub projector; calculates a total four corner maximum luminance obtained by summing, for each of the four corners, the luminance of the four corners of the projection surface acquired by the own projector and the luminance of the four corners of the projection surface acquired from the sub projector; sets, as the projection surface maximum luminance, a smallest value of the maximum luminance of each corner of the total four corner maximum luminance; and creates a tone map of the four corners of each of the own projector and the sub projector based on the projection surface maximum luminance and the ratio of the luminance of each corner of the projection surface to the maximum luminance of each corner of the total four corner maximum luminance of each of the own projector and the sub projector.

[Supplementary Note 20]

A video display method performed by a projector that includes a spatial light modulator that modulates light from a light source to emit a modulated light and a tone map unit that performs a luminance gradation conversion of an input video data according to a tone map indicating a relationship of an output luminance with respect to an input luminance, the projector being configured to drive the spatial light modulator based on an output video data of the tone map unit and to project the modulated light on a screen, the method comprising:

obtaining a maximum luminance of a projection surface of the modulated light;

when the maximum luminance of the projection surface is equal to or greater than a first threshold value indicating a maximum luminance of the input video data, setting, to the tone map unit, a tone map in which a maximum value of the input luminance is set to be the first threshold value; and when the maximum luminance of the projection surface is larger than the first threshold value, reducing an amount of light of the light source.

[Supplementary Note 21]

A program that is executed by a computer of a projector that includes a spatial light modulator that modulates light from a light source to emit a modulated light and a tone map unit that performs a luminance gradation conversion of an input video data according to a tone map indicating a relationship of an output luminance with respect to an input luminance, the projector being configured to drive the spatial light modulator based on an output video data of the tone map unit and to project the modulated light on a screen, the program causing the computer to execute the steps of:

obtaining a maximum luminance of a projection surface of the modulated light;

when the maximum luminance of the projection surface is equal to or greater than a first threshold value indicating a maximum luminance of the input video data, setting, to the tone map unit, a tone map in which a maximum value of the input luminance is set to be the first threshold value; and when the maximum luminance of the projection surface is larger than the first threshold value, reducing an amount of light of the light source.

EXPLANATION OF REFERENCE NUMBERS

30 Control unit
31 Light source
32 Spatial light modulator
33 Projection lens unit
34 Luminance acquiring unit
35 Tone map unit
36 Signal processing unit
37 Screen

The invention claimed is:

1. A projector comprising:
a light source;
a spatial light modulator that modulates light from said light source to emit a modulated light;
a signal processing unit that comprises a tone map unit that performs a luminance gradation conversion of an input video data according to a tone map indicating a relationship of an output luminance with respect to an input luminance and that drives said spatial light modulator based on an output video data of said tone map unit;
a projection lens unit that projects the modulated light on a screen;
a luminance acquiring unit that obtains a maximum luminance of a projection surface of the modulated light; and
a control unit that controls an amount of light of said light source and sets the tone map,
wherein:
when the maximum luminance of the projection surface is equal to or greater than a first threshold value indicating a maximum luminance of the input video data, said control unit sets, to said tone map unit, a tone map in which a maximum value of the output luminance is set to be the first threshold value, and when the maximum luminance of the projection surface is larger than the first threshold value, said control unit reduces the amount of light of said light source.

2. The projector according to claim 1, wherein said control unit sets a tone map in which a gamma coefficient is set so that the maximum value of the output luminance is to be the maximum luminance of the projection surface when the maximum luminance of the projection surface is less than the first threshold value and is equal to or greater than a second threshold value that is smaller than the first threshold value, and sets a gradation characteristic such that an amount of changes in the output luminance is smaller than an amount of changes in input luminance in a predetermined gradation range on a high luminance side of the tone map.

3. The projector according to claim 2, wherein said control unit sets a tone map in which the gamma coefficient is set so that the maximum value of the output luminance is to be the second threshold value when the maximum luminance of the projection surface is less than the second threshold value, and sets the gradation characteristic such that the amount of changes in the output luminance is smaller than the amount of changes in the input luminance in the predetermined gradation range on the high luminance side of the tone map.

4. The projector according to claim 3, wherein said signal processing unit comprises:
an information storage unit that stores at least EOTF (Electro-Optical Transfer Function) information;
an interface unit that is capable of mutually communicating with a source device, supplies the EOTF information stored in said information storage unit to said source device and receives a video signal from said source device;
a video processing unit that receives the video signal from said source device via said interface unit, performs an EOTF process on the video data included in the video signal in accordance with the EOTF information stored in said information storage unit, and supplies, as the input video data, the video data after the EOTF process is performed to said tone map unit,
wherein said control unit stores the EOTF information related to an HDR (High Dynamic Range) display in said information storage unit when the maximum luminance of the projection surface is equal to or greater than the second threshold, and stores the EOTF information related to a SDR (Standard Dynamic Range) display in said information storage unit when the maximum luminance of the projection surface is less than the second threshold.

5. The projector according to claim 3, wherein the second threshold is twice a maximum value of an intra-frame average luminance of the input video data.

6. The projector according to claim 2, wherein said control unit sets a tone map having a linear gradation characteristic in which the maximum value of the output luminance is set to be the second threshold value when the maximum luminance of the projection surface is less than the second threshold value.

7. The projector according to claim 6, wherein said signal processing unit comprises:
an information storage unit that stores at least EOTF (Electro-Optical Transfer Function) information;
an interface unit that is capable of mutually communicating with a source device, supplies the EOTF information stored in said information storage unit to said source device and receives a video signal from said source device;
a video processing unit that receives the video signal from said source device via said interface unit, performs an EOTF process on the video data included in the video signal in accordance with the EOTF information stored in said information storage unit, and supplies, as the input video data, the video data after the EOTF process is performed to said tone map unit,
wherein said control unit stores the EOTF information related to an HDR (High Dynamic Range) display in said information storage unit when the maximum luminance of the projection surface is equal to or greater than the second threshold, and stores the EOTF information related to a SDR (Standard Dynamic Range) display in said information storage unit when the maximum luminance of the projection surface is less than the second threshold.

8. A stack display system comprising a main projector and at least one sub projector, each comprising the projector according to claim 1, wherein the main projector and the sub projector project overlap and project images of each other on a screen, wherein a control unit of said main projector acquires information relating to a maximum luminance of a projection surface acquired by said sub projector and creates a tone map of each of its own projector and said sub projector based on information relating to the maximum luminance of the projection surface acquired by the own projector and information relating to the maximum luminance of the projection surface acquired from said sub projector.

9. The stack display system according to claim 8, wherein said control unit of said main projector acquires the maximum luminance of the projection surface from said sub projector, calculates a total maximum luminance by summing the maximum luminance of the projection surface obtained by the own projector and the maximum luminance of the projection surface obtained from said sub projector, and creates a tone map of each of the own projector and the sub projector based on the total maximum luminance and the ratio of the maximum luminance of the projection surface to the total maximum luminance of each of the own projector and the sub projector.

10. The stack display system according to claim 8, wherein said control unit of said main projector acquires the luminance of the four corners of the projection surface from said sub projector; calculates a total four corner maximum luminance obtained by summing, for each of the four corners, the luminance of the four corners of the projection surface acquired by the own projector and the luminance of the four corners of the projection surface acquired from said sub projector; sets, as the projection surface maximum luminance, a smallest value of the maximum luminance of each corner of the total four corner maximum luminance; and creates a tone map of the four corners of each of the own projector and said sub projector based on the projection surface maximum luminance and the ratio of the luminance of each corner of the projection surface to the maximum luminance of each corner of the total four corner maximum luminance of each of the own projector and said sub projector.

11. The projector according to claim 1, further comprising:
a light sensor that measures the amount of light of said light source;
a ranging unit that measures a distance from said projection lens unit to said screen; and
a screen characteristic storage unit that stores characteristic data indicating a gain distribution of exit light with respect to incident light for each of a plurality of screens, wherein said luminance acquiring unit acquires characteristic data of a screen specified by a user from said screen characteristic storage unit, and calculates the maximum luminance of the projection surface based on the obtained characteristic data, the amount of light of said light source measured by said light sensor, and the distance measured by said ranging unit.

12. The projector according to claim 11, wherein said projection lens unit comprises a zoom lens unit that is configured to move at least a port of lenses in the optical axis direction,
wherein said luminance acquiring unit calculates the maximum luminance of the projection surface based on the characteristic data of the screen specified by a user, the amount of light of said light source measured by said light sensor, the distance measured by said ranging unit, and the zoom position indicating a position of the at least a part of lenses in the optical axis direction.

13. The projector according to claim 12, wherein said projection lens unit further comprises a lens shift unit that moves a lens group in a direction perpendicular to the optical axis,
wherein said luminance acquiring unit includes:
a lens shift luminance coefficient storage unit that stores a coefficient of luminance attenuation of the projection surface corresponding to a movement direction and a movement amount of the lens group;
a projection surface coordinate calculation unit that calculates the coordinates of the four corners of the projection surface based on the moving direction and the movement amount of the lens group, the zoom position, and the distance measured by said ranging unit;
a projection light amount calculation unit that calculates an amount of projected light obtained by multiplying the amount of light of said light source measured by said light sensor by a predetermined gain;
a projection surface incident luminance calculation unit that acquires the coefficient of luminance attenuation corresponding to the movement direction and the movement amount of the lens group from said lens shift luminance coefficient storage unit and that calculates incident luminance at the four corners of the projection surface based on the obtained coefficient, the coordinates of the four corners of the projection surface calculated by said projection surface coordinate calculation unit, and the amount of the projected light calculated by said projection light amount calculation unit;
a screen gain calculation unit that calculates an incident angle on the four corners of the projection surface based on the coordinates of the four corners of the projection surface calculated by said projection surface coordinate calculation unit and that calculates the gain of exit light from the four corners based on the incident angle of the four corners and the characteristic data of the screen specified by a user; and
a projection surface exit luminance calculation unit that calculates the luminance of the four corners of the projection surface based on the incident luminance to the four corners of the projection surface calculated by said projection surface incident luminance calculation unit and the gain at the four corners of the projection surface calculated by said screen gain calculation unit,
wherein the maximum luminance of the projection surface is the smallest value from among the luminance values of the four corners of the projection surface calculated by said projection surface exit luminance calculation uni.

14. The projector according to claim 13, wherein said signal processing unit further includes:
a distortion correction data storage unit that stores a distortion correction data for correcting a distortion of a projected image caused according to an angle formed between the screen and a lens center axis of said projection lens unit; and
a distortion correcting unit that performs distortion correction based on the distortion
correction data with respect to an output video data of said tone map unit,
wherein said projection surface coordinate calculation unit calculates the coordinates of the four corners of the projection surface based on the movement direction and movement amount of the lens group, the zoom position, the distance measured by said ranging unit, and the distortion correction data.

15. The projector according to claim 13, wherein said signal processing unit further includes a projection surface luminance correction unit that adjusts a gain of each pixel of an output video data of said tone map unit according to a luminance correction coefficient for correcting a non-uniformity of the luminance of the projection surface,
wherein said control unit generates the luminance correction coefficient based on the luminance values of the four corners of the projection surface calculated by said projection surface exit luminance calculation unit.

16. The projector according to claim 1, wherein said luminance acquiring unit calculates the luminance at a plurality of points on the projection surface of the modulated light according to the projection state, and sets the smallest value from among the luminance value of each point as the maximum luminance of the projection surface.

17. The projector according to claim 1, further comprising a communication unit that mutually communicates with at least one other projector,
wherein said control unit acquires, via said communication unit, information relating to the maximum luminance of the projection surface obtained by said another projector, and creates a tone map of each of the own projector and said another projector based on information relating to the maximum luminance of the projection surface obtained by the own projector and the information relating to the maximum luminance of the projection surface obtained from said another projector.

18. The projector according to claim 17, wherein said control unit acquires the maximum luminance of the projection surface from said another projector, calculates a total maximum luminance obtained by summing the maximum luminance of the projection surface obtained by the own projector and the maximum luminance of the projection surface obtained from said another projector, and creates a tone map of each of the own projector and said another projector based on the total maximum luminance and the ratio of the maximum luminance of the projection surface to the total maximum luminance of each of the own projector and said another projector.

19. The projector according to claim 17, wherein said control unit acquires the luminance of the four corners of the projection surface from said another projector; calculates a total four corner maximum luminance obtained by summing, for each of the four corners, the luminance of the four corners of the projection surface acquired by the own projector and the luminance of the four corners of the projection surface acquired from said another projector; sets, as the projection surface maximum luminance, a smallest value of the maximum luminance of each corner of the total four corner maximum luminance; and creates a tone map of the four corners of each of the own projector and said another projector based on the projection surface maximum luminance and the ratio of the luminance of each corner of the projection surface to the maximum luminance of each corner of the total four corner maximum luminance of each of the own projector and said another projector.

20. A video display method performed by a projector that includes a spatial light modulator that modulates light from a light source to emit a modulated light and a tone map unit that performs a luminance gradation conversion of an input video data according to a tone map indicating a relationship of an output luminance with respect to an input luminance, said projector being configured to drive said spatial light modulator based on an output video data of said tone map unit and to project the modulated light on a screen, said method comprising:

obtaining a maximum luminance of a projection surface of the modulated light;

when the maximum luminance of the projection surface is equal to or greater than a first threshold value indicating a maximum luminance of the input video data, setting, to said tone map unit, a tone map in which a maximum value of the input luminance is set to be the first threshold value; and when the maximum luminance of the projection surface is larger than the first threshold value, reducing an amount of light of said light source.

21. A non-transitory computer-readable recording medium recorded with a program that is executed by a computer of a projector that includes a spatial light modulator that modulates light from a light source to emit a modulated light and a tone map unit that performs a luminance gradation conversion of an input video data according to a tone map indicating a relationship of an output luminance with respect to an input luminance, said projector being configured to drive said spatial light modulator based on an output video data of said tone map unit and to project the modulated light on a screen, said program causing the computer to execute:

obtaining a maximum luminance of a projection surface of the modulated light;

when the maximum luminance of the projection surface is equal to or greater than a first threshold value indicating a maximum luminance of the input video data, setting, to said tone map unit, a tone map in which a maximum value of the input luminance is set to be the first threshold value; and when the maximum luminance of the projection surface is larger than the first threshold value, reducing an amount of light of said light source.

* * * * *